United States Patent [19]

Robins et al.

[11] Patent Number: 5,049,873

[45] Date of Patent: Sep. 17, 1991

[54] COMMUNICATIONS NETWORK STATE AND TOPOLOGY MONITOR

[75] Inventors: Paul A. Robins, San Francisco; Paul D. Alvik, Cupertino; Christopher S. Helgeson, Mountain View; Michael R. Gannon, Menlo Park; William A. Bishop, Mountain View; Sandra L. Mumaw, San Jose; Karen L. Forkish, Redwood City; Seck-Eng Tan, Mountain View; Tim O. Radzykewycz, Newark, all of Calif.; Roland Dupont, Grand Duchy, Luxembourg

[73] Assignee: Network Equipment Technologies, Inc., Redwood City, Calif.

[21] Appl. No.: 520,111

[22] Filed: May 4, 1990

Related U.S. Application Data

[63] Continuation of Ser. No. 150,354, Jan. 29, 1988, abandoned.

[51] Int. Cl.$^5$ ............... H04M 15/00; G05B 23/00
[52] U.S. Cl. .................. 340/825.06; 340/825.07; 340/825.16; 379/14; 379/32; 379/33
[58] Field of Search ............. 379/32, 33, 34, 92, 379/11, 14, 9, 10, 12, 49, 63; 370/13, 14, 16, 17, 58.2; 371/25; 340/825.06, 825.07, 825.16, 825.17

[56] References Cited

U.S. PATENT DOCUMENTS

| | | | |
|---|---|---|---|
| 4,446,341 | 5/1984 | Rubin | 379/12 |
| 4,464,543 | 8/1984 | Kline et al. | 379/14 |
| 4,581,493 | 4/1986 | Gazzo et al. | 379/12 |
| 4,782,506 | 11/1988 | Sevcik | 379/10 |

OTHER PUBLICATIONS

Duff, C. K., "Choice of Telemetering Sysmes and Channels for a Power System", May 1951, FIG. 2.

Kjonigsen, Jan, "Subsciber Line Management System, SLS 160", 1984.
Microsoft, MacWorld, vol. 1, No. 1, 1984, p. 4.
Wiltron Company, "CMTS Centralized Maintenance Test System", 2/4/83, FIG. 2.

Primary Examiner—Donald J. Yusko
Assistant Examiner—Peter Weissman
Attorney, Agent, or Firm—Fliesler, Dubb, Meyer & Lovejoy

[57] ABSTRACT

A system gathers and displays information concerning status of a communications network without overloading the communications channels in the network. The monitoring system includes a monitor node, including an operator input interface. The monitor node is coupled to a first switching node in the distributed switching nodes of the network. The monitor node includes a first application maintaining topology data indicating the topology of the network and supporting a first protocol for updating the data with the first switching node. In addition, the monitor node includes a second application maintaining a list of alarm conditions entered in the node event logs in the network, and supporting a second protocol for updating the list with the plurality of distributed switching nodes. A third application runs in the monitor node for maintaining a monitor database indicating the configuration of the switching nodes as it is entered in the node configuration databases in the network. This third application also supports a third protocol for updating the monitor database with the plurality of distributed switching nodes for updates to the node configuration database. Distributed applications in the switching nodes support the protocols with the monitor node without interference with communications tasks in the network. A display application that is responsive to operator inputs identifying a subject node or other object in the network having plural windows on a display monitor, presents configuration data about the subject node, the network topology and the alarm conditions to the operator.

27 Claims, 16 Drawing Sheets

General system overview-EVA

Event log snapshot before and after a wrap

EvAPE Message Buffer and compressing of events

Storing event records

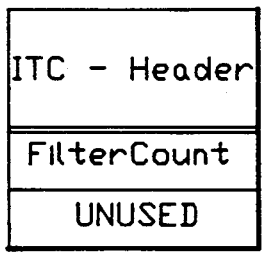

EvA → EvAPE

ITC - Header
FilterCount — number of MsgFilterRequests following
UNUSED — for future extensions : window size (PktGrant)

Open Session Message Structure

FIG.-9

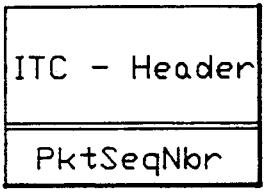

EvAPE → EvA

ITC - Header
PktSeqNbr — last packet sequence number sent

Confirm Message Structure

FIG.-10

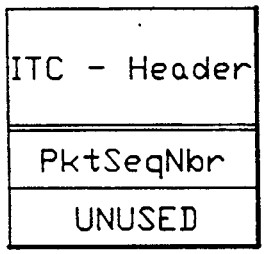

EvA → EvAPE

ITC - Header
PktSeqNbr — packet sequence number expected
UNUSED — for future extension : dynamic adjustment of window size Next Packet Message Structure

FIG.-11

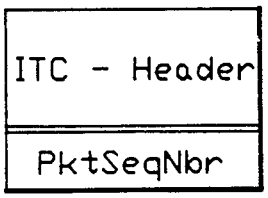

EvA → EvAPE

ITC - Header
PktSeqNbr — last packet sequence number received

Close Session Message Structure

FIG.-12

Event Packet Message Structure

EvA state transition diagram

EvAPE state transition diagram

ATA DATA FLOW

Session Initialization

Normal Session Protocol

ATAPE Reset Scenario

Message Exchange Protocol
(Normal)

Message Exchange Protocol
(Lost Messages)

Message Exchange Protocol
(Out of Sync)

COMMUNICATIONS NETWORK STATE AND TOPOLOGY MONITOR

This application is a File Wrapper Continuation of Ser. No. 07/150,354, filed Jan. 29, 1988, now abandoned.

BACKGROUND OF THE INVENTION

1. Field of the Invention

The present invention relates to apparatus for monitoring the status of a communication network, and more particularly, for presenting status information concerning a network to an operator in graphical form.

2. Description of Related Art

Large communication networks consist of many switching nodes interconnected by communication links. The switching nodes perform complex communications tasks, such as call routing, link control and data compression. Various switches within the network will perform different sets of these communications tasks depending on the manner in which the nodes have been configured by the user. Further, the links interconnecting the nodes are of a variety of types, each having unique features, such as satellite or terrestrial lines.

The switches and links are often geographically separated by some distance. As switches are changed, new features are added or switches are deleted, the configuration of the network can change significantly at locations quite remote from the operator. Further, the distributed switching nodes suffer alarm conditions, such as breakdown of functional modules or failure of communication protocols in real time that must be communicated to an operator of the system. Likewise, links can be added, deleted and changed in real time from geographically separate locations.

An operator performing network diagnostics or trouble-shooting tasks, needs efficient access to current status information concerning a network. In particular, the topology of the network, alarm conditions and the configuration of the various nodes and links in the network is critical information.

The task of gathering status information from a large communication network in a timely manner and presenting that information in a usable form to an operator can be quite complex. Preferably, this monitoring task should interfere as little as possible with the communications task going on in the network and not overload the communications channels with monitoring information being forwarded to a single monitoring station in the network. Further, it is preferable that the monitoring apparatus be implemented without large scale changes to communications tasks running in the network in order to support the monitoring function.

SUMMARY OF THE INVENTION

The present invention provides an apparatus for gathering and displaying information concerning status of a communications network without overloading the communications channels in the network. Further, the information is displayed to the operator in a novel and useful form. Finally, the apparatus is implemented with minimal impact on the design of the running communication tasks in the network.

The network in which the present invention operates, includes a plurality of distributed switching nodes and a plurality of links connecting the switching nodes. Each of the switching nodes performs communications functions to serve calls and data being transferred through the network. Further, each of the switching nodes maintains a node event log including a node alarm table that lists alarm conditions for the node, and maintains a node configuration database, identifying a configuration of tasks and hardware running on the node.

The monitoring apparatus according to the present invention, comprises a monitor node, including an operator input interface. The monitor node is coupled to a first switching node in the plurality of distributed switching nodes. The monitor node includes a first application maintaining topology data indicating the topology of the network and supporting a first protocol for updating the data with the first switching node. In addition, the monitor node includes a second application maintaining a list of alarm conditions entered in the node event logs in the network, and supporting a second protocol for updating the list with the plurality of distributed switching nodes. A third application runs in the monitor node for maintaining a monitor database indicating the configuration of the switching nodes as it is entered in the node configuration databases in the network. This third application also supports a third protocol for updating the monitor database with the plurality of distributed switching nodes for updates to the node configuration database.

The monitor node further includes a display application that is responsive to operator inputs identifying a subject node or other object in the network and is coupled to the monitor database, the list of alarm conditions and the topology data. The display application presents plural windows on a display monitor, presenting configuration data about the subject node, the network topology and the alarm conditions to the operator.

On the first switching node to which the monitor node is coupled, an application generates topology data in response to the communications functions performed on the node and sends in response to the first protocol with the first application in the monitor node, the topology data to the first application.

On each of the distributed switching nodes in the network, including the first switching node, an application coupled to the node event log and responsive to the second protocol with the second application, packages and sends data indicating alarm conditions entered in the node event log to the second application. In addition, on each of the plurality of distributed switching nodes in the network including the first switching node, an application coupled to the node configuration database, and responsive to the third protocol with the third application, packages and sends data from the node configuration database to the third application through the network.

According to another aspect of the invention, the monitor node includes a fourth application which maintains a list of event records entered in the node event logs in the network and supports a fourth protocol with the distributed switching nodes. On each of the plurality of distributed switching nodes, an application coupled to the node event log on the node and responsive to the fourth protocol with the fourth application, packages and sends data indicating event reports entered in the node event log to the fourth application.

Additional features of the present invention can be determined from a review of the following drawings, detailed description and claims.

BRIEF DESCRIPTION OF THE FIGURES

FIG. 9 illustrates the message structure for the open session message in the event application.

FIG. 10 illustrates the confirm message structure for the event application.

FIG. 11 illustrates the next packet message structure for the event application.

FIG. 12 illustrates the close session message structure for the event application.

DESCRIPTION OF THE PREFERRED EMBODIMENTS

With reference to the figures, a detailed description of preferred embodiments of the present invention is provided.

In particular, a system level description is provided with reference to FIGS. 1-5. Following the system level description, the distributed applications running in the preferred embodiment, pertinent to the present invention, are described.

I. System Overview

Figure 1:
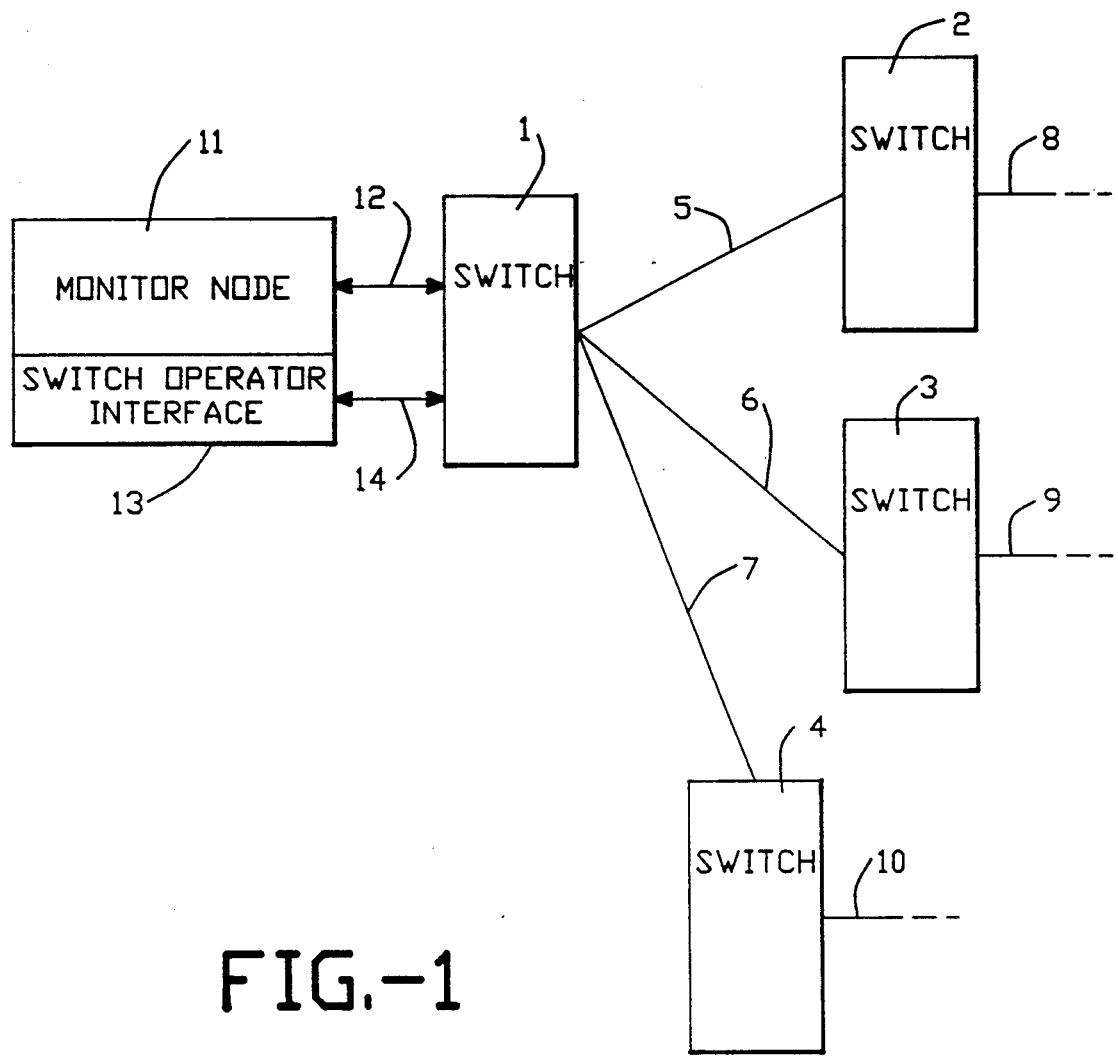
FIG. 1 is a block diagram providing a system overview according to the present invention.

FIG. 1 illustrates the communication system in which the present invention operates. In particular, the communication system includes a plurality of distributed switching nodes 1,2,3,4, such as Integrated Digital Network Exchange (IDNX) transmission resource managers provided by the assignee of the present invention. The switching nodes are interconnected by links 5,6,7, among each other, and across links 8,9,10 to other switching nodes in the network.

The switching node 1 is connected to a monitor node 11 across link 12. Coupled with the monitor node 11 is an operator interface 13 used for access to configuration programs running in the switching nodes in the network and which communicates with the switching node 1 across link 14. The monitor node displays status information concerning the plurality of distributed switching nodes and links in the network. The operator utilizing the information displayed on node 11, operates the configuration programs through the interface 13 to perform diagnostic functions, trouble-shooting and configuration tasks throughout the network.

II. Display Windows

Figure 2:
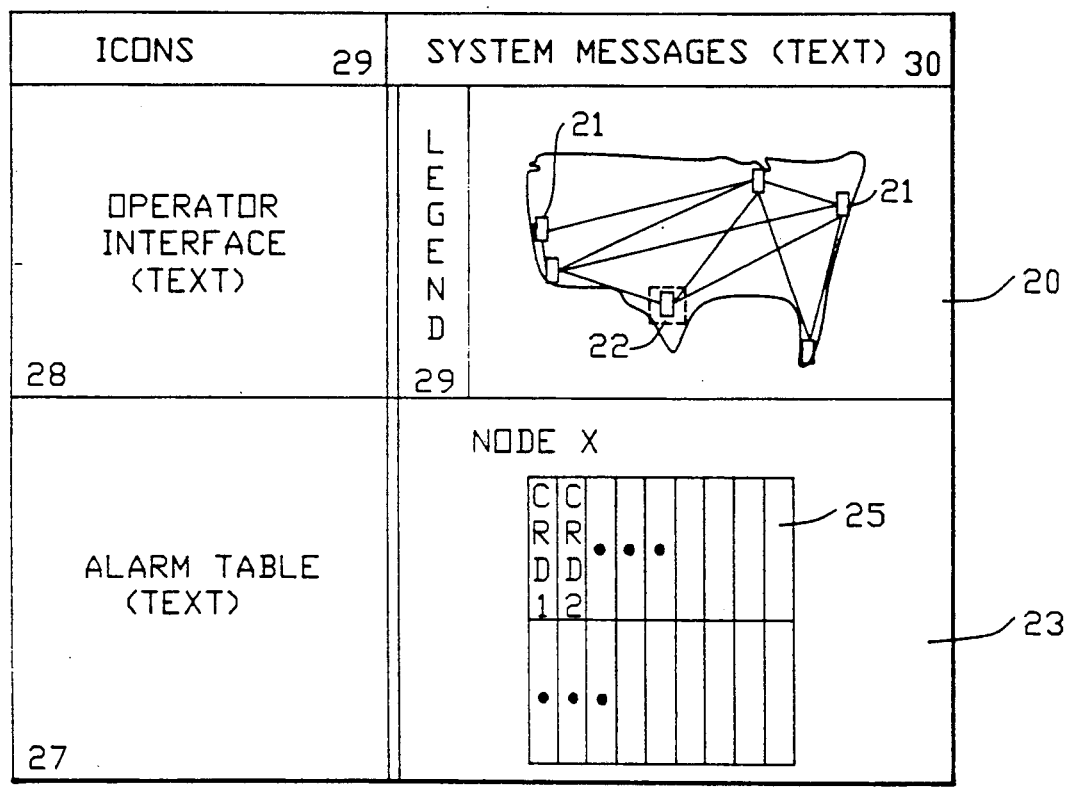
FIG. 2 is a diagram of the multiple windows on the display of the monitor node according to the present invention.

The monitor node 11 includes a display, such as a monitor provided with a Sun Microsystems, Inc. workstation, that includes a plurality of windows as illustrated in FIG. 2. The first window 20 on the display, graphically presents the topology of the network to the operator. As illustrated in FIG. 2, the network includes a plurality of distributed switching nodes 21 which are geographically spread across the continental United States. The window 20 displays a map of the U.S. with indicators of the locations of the switching nodes and lines indicating links between them. In addition, the window 20 includes highlighting features for particular nodes as illustrated at 22 to indicate alarm conditions occurring at the node. In the preferred embodiment, nodes are highlighted using color, and a legend 29 is provided to ease interpretation. The legend 29 also includes information identifying symbols for graphically depicting network components.

A second window 23 on the display illustrates a configuration of a subject node, Node X. Through the user interface, the operator can designate a subject node using, for instance, a mouse and cursor technique, commonly used in windowing display systems. The mouse could be used to move the cursor to a subject node on the network topology map in window 20. By setting a switch on the mouse, the selected node configuration can be brought up and displayed in window 23. Node configuration includes a graphic display 25 illustrating functional elements CRD1, CRD2 . . . of the node. In addition, the textual information 26 concerning cards and links in the network, can be listed using a mouse and windowing algorithm.

A third window 27 on the display, presents a list of alarm conditions occurring throughout the network.

A fourth window 28 on the display is used as an interactive user interface window, such as may serve the operator interface 13 to switch configuration tools, switch diagnostics, and the like. This area on the screen is also used for configuration programs for the monitor node.

A fifth window 29 on the display, provides a menu service for the operator based on icons.

An additional text window 30, displays monitor system messages, such as the status of various monitor applications.

This display format provides information concerning status and alarm conditions in the network in a usable form.

III. Monitor Node Overview

Figure 3:
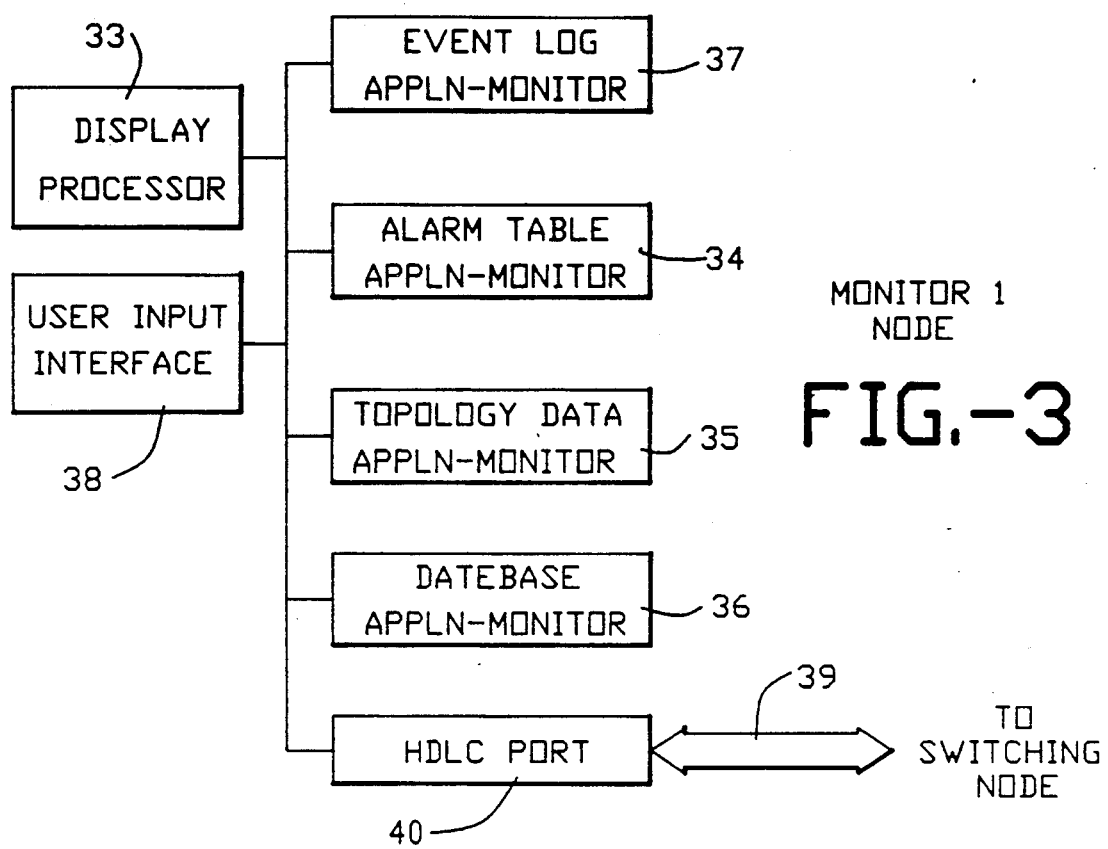
FIG. 3 is a block diagram of the monitor node according to the present invention.

FIG. 3 is a block diagram of applications running on the monitor node according to the present invention. As mentioned above, the monitor node includes a display processor 33 which supports the display described with reference to FIG. 2. Information is supplied to the display processor 33 from an alarm table application 34, a topology data application 35 and a database application 36. The monitor node includes, in addition, an event log application 37, which maintains a log of event records from distributed switching nodes in the network. This is used for report generation rather than being directly used by the display processor 33.

The monitor node also includes a user input interface device or devices 38, such as a keyboard and mouse as described above, in order to identify a subject node for display in the node configuration window 23 of the display processor 33.

The monitor node is connected across a HDLC link 39 to a switching node in the network. Accordingly, a HDLC port server application 40 is included through which messages from the alarm table application, topology data application, database application and event log application are sent to the distributed switching nodes. Further, data is received through the HDLC port 40 from the distributed switching node in response to the requests.

The event log application 37, alarm table application 34, topology data application 35 and database application 36, are distributed tasks with part of each task running on the monitor node and the remainder of the task running on the switching nodes of the network. The details of these tasks are provided below.

IV. Switching Node Overview

Figure 4:
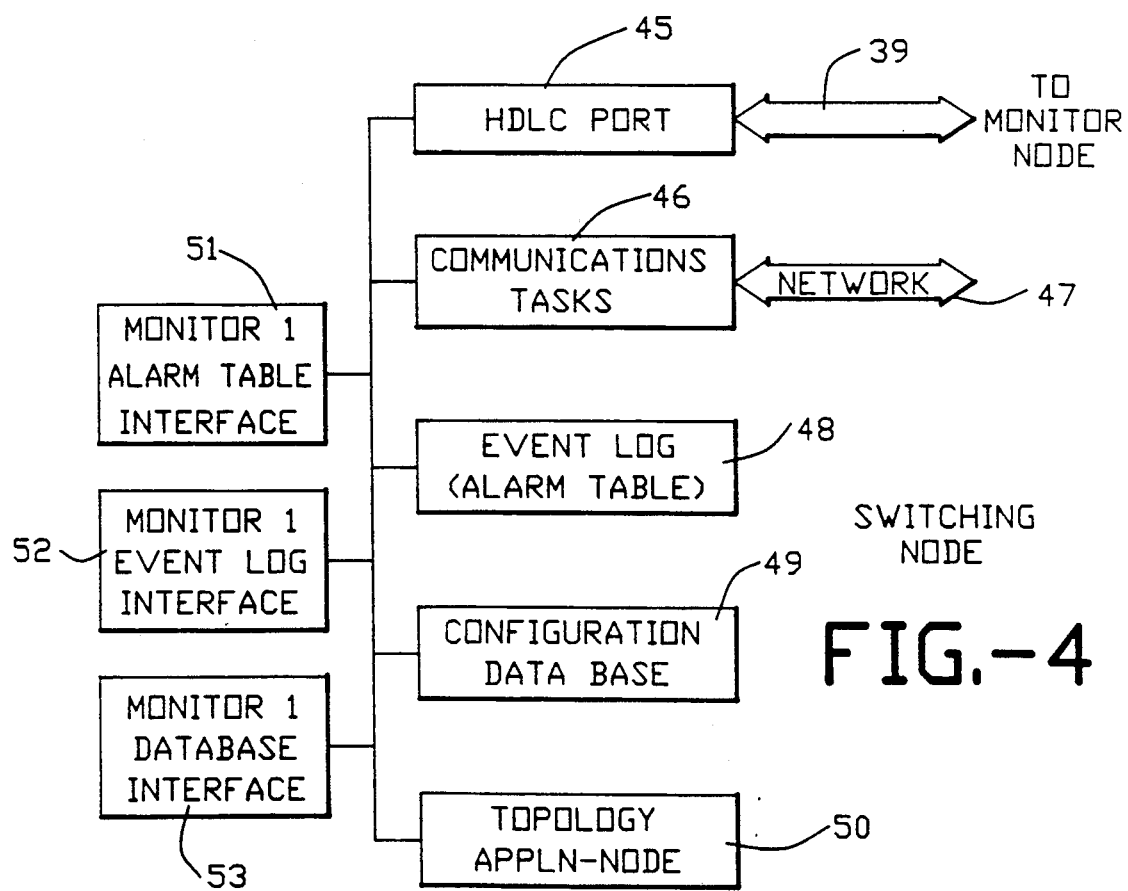
FIG. 4 is a block diagram of a switching node according to the present invention.

FIG. 4 illustrates tasks running on a switching node which is coupled to a monitor node in the network. Accordingly this switching node includes a HDLC port 45 coupled to the HDLC link 39 for receiving communications and supplying messages to the monitor node. In addition, the switching node as illustrated in FIG. 4, performs communications functions as illustrated schematically at 46 for managing communications through the network 47. An event log 48 is maintained by the switching node in response to the communications task 46. In addition, a configuration database 49 is maintained on the switching node which indicates the configuration of the local node. Finally, a topology application 50 runs on the switching node in order to maintain a database indicating the topology of the network which is used by the communications task 46 in call routing and similar operations.

In addition, an alarm table interface 51, an event log interface 52 and a database interface 53 run on the switching node illustrated in FIG. 4. Each of these interfaces 51,52,53 called attached processor executors APE, are adapted to pre-process and package information from the event log 48 or configuration database 49 and forward that information to the monitor node in response to requests from the monitor node. In addition, each of these interfaces 51,52,53 serves a single monitor node. In the embodiment shown in FIG. 4, these interfaces serve monitor No. 1. If a second monitor is added to the network, a second alarm table interface for the second monitor, a second event log interface for the second monitor and a second database interface for the second monitor, are required.

The topology application 50 responds directly to requests it receives from a monitor node attached to that switching node, to supply topology data. Since this information is maintained for the entire network, the node to which the monitor node is coupled across the HDLC link 39 is the only node that must send topology data to the monitor node.

The event log in the preferred embodiment maintains event records for the node and an alarm table. The interface for the alarm table is separated from the interface for the event log in order to ensure integrity of the alarms as discussed in more detail below.

Figure 5:
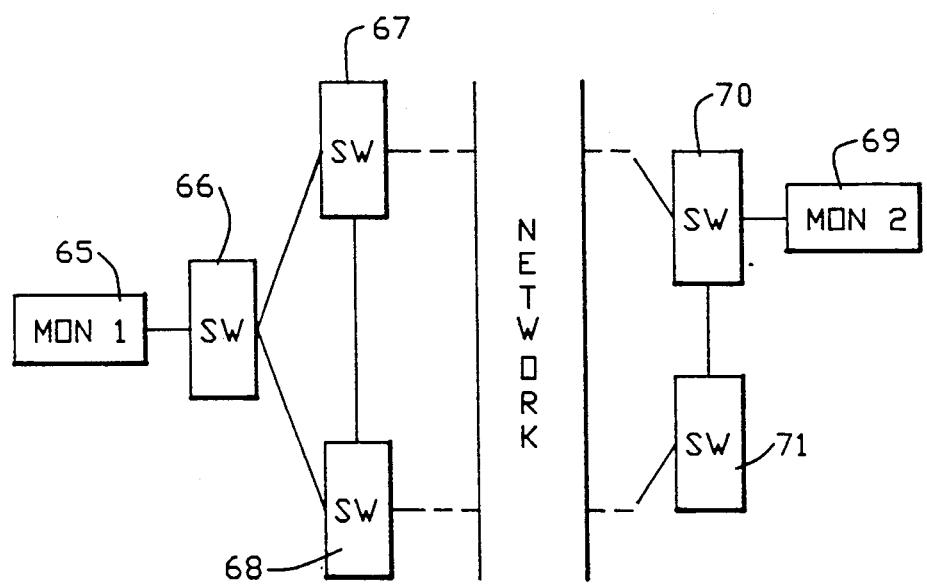
FIG. 5 is a block diagram illustrating a system including a plurality of monitor nodes according to the present invention.

FIG. 5 is a schematic diagram of a network including two monitors. Because the monitor tasks according to the present invention, interfere very little with communications tasks in the network, the present invention allows a plurality of monitors to be coupled to a single network. Accordingly, a first monitor MON1 65 is coupled to a first switching node 66 in the network. Switching node 66 is coupled to switching node 67 and 68 and through nodes 67 and 68 to other switching nodes in the network. A second monitor MON2 69, is coupled to switching node 70. Switching node 70 is coupled to switching node 71 and to other nodes in the network. As mentioned above, each of the nodes in the network served by the respective monitors, MON1 and MON2, will have an alarm table interface 51 for each monitor, an event log interface for each monitor and a database interface for each monitor. Switching node 66 will send topology data to the monitor MON1 and switching node 70 will send topology data to the monitor MON2.

V. Monitor System Operation

In the preferred embodiment, a display process server 33 and a user input interface 38 of the monitor system, manage the display of current network state and topology, provides a menu service and provides a configuration module for use by the operator. The current state of the network is determined through notifications from the alarm table application 34 of alarms occurring in the distributed switching nodes, from the network topology application 35 of nodes going up and down in the network, and from the database application 36 of changes to switching node configurations. In addition, the configuration module supplies information to the display processor 33, indicating when nodes are added or deleted from the network, and for modification of the windows displayed.

In large networks in which all nodes are configured to the maximum, the data space requirement for the monitor node will be immense. To maintain a reasonable virtual size, the display processor 33 constructs card configuration information at the card level and below only when images are required as indicated by an operator.

The monitor node includes an underlying data management system based on the commercially available database known as ORACLE. Each application on the monitor that uses the ORACLE needs read, insert and update functions on widely disparate tables, rows and columns. The interface to the database management system on the monitor is a function call that is responsive to SQL statements issued by the applications. The database contains all the node configuration data from the database application 36, event records from the event log application 37 along with text descriptions. A standard SQL window is provided to the operator of the monitor node through which the user may make arbitrary queries of the database.

A watchdog task periodically counts the number of events listed in the database and initiates a session with the user, requiring him to archive and purge events and errors to free space in the storage system.

The interface between the monitor node and the switching node allows for sending of messages between the monitor node and tasks in the switching nodes. As mentioned above, the interface is an HDLC link with tasks running on the monitor node and its attached switching node, for managing the interface.

On the monitor side of the link, messages from the applications running on the monitor are written over the HDLC link. Also, packets received from the link are distributed to appropriate applications on the monitor node. On the switching node side of the link 39, a task receives incoming messages from the network and from the monitor. This task acts as a "ghostwriter" for all monitor applications. Incoming packets contain full network messages. The distributed tasks serving the monitor system simply insert an identifier of the node on which they are running in a message which is transparently sent to the network. A task on the switching node to which the monitor node is attached then forwards the message from the monitor node with the header intact.

The monitor node includes kernel and system initialization applications which are not shown in the block diagram. The kernel provides intertask communication, memory management, debugging and tracing, and task management functions to the plurality of applications running on the node. The kernel uses a UNIX IPC user-datagram protocol (UDP) as its underlying transport mechanism. The kernel determines that messages from applications running on the monitor should be supplied across the HDLC links to the coupled switching node into the network.

The monitor system event application retrieves events from all the nodes in the network. The application consists of two parts: the event log application running on the monitor, and the event log interface running on the distributed switching nodes. The monitor node receives event information from the switching nodes through the network and logs the information to the ORACLE database. The event log interface running on the switching nodes retrieves event information from an event log manager on the switching nodes and sends the information on to the monitor node.

Detailed specifications of these tasks are provided below.

The alarm table application consists of an application running on the monitor node and an interface application running on the switching node. This application retrieves alarm tables from the distributed switching nodes in the network as they changed so that the display system and subsequently other applications running on the monitor can keep track of the changing status of the network. The alarm table application (ATA), is the single source of alarm information to the monitor node. Even though this information is obtainable from the event string, it is not extracted in this manner. In addition, the alarm table application manages information supplied to the window which contains a display of the active alarms in the network sorted by criticality, time and node.

The network topology application (NTA) is the single source of information for the rest of the monitor node applications for information about the current state of the network topology as known on the monitor node. It retrieves the network topology map from a network managing task running on the node to which the monitor node is attached. This information is retrieved on a regular polled basis.

The database application (DBA) retrieves configuration databases from the switching nodes distributed throughout the network and stores them in a monitor node format on the database system of the monitor node. The configuration databases are uploaded whenever the monitor node detects that a database on a switching node has changed and the monitor node cannot determine which part of the database has changed. This application is distributed between the monitor node and the plurality of switching nodes. The two parts of the application communicate with a protocol that gives reliable in-order delivery of the database blocks. In addition, when the databases are updated at a switching node, the changes are sent to the monitor node.

A graphical configuration tool allows for definition and placement of nodes, networks and views for the display processor. The basic network object is a node. Before the display of information about a node is constructed, the user must enter the node in the ORACLE database of the monitor node. Once this node is placed in the database, it is available to the display processor.

A graphical configurator application running in the display system is used by an operator to group nodes and sub-networks for display purposes, if necessary. The networks and nodes are placed in views. Within a view, the user can place the nodes in any location which allows for creating a view which is readily decipherable.

The switching node sides of the respective monitor node applications share several architectural characteristics. The first is that they all use protocol that ensures an in-order, reliable exchange of data with the monitor node. This protocol for all applications is a positive acknowledgment protocol with a window size of 1. This makes the protocol a simple command-response sequence, providing control for the amount of traffic in the network at a given time serving the monitor node. Of greatest concern is the number of messages arriving at the switching node to which the monitor node is attached. This protocol prevents a flood of monitor information from overloading that node.

A second architectural characteristic of the applications on the switching node side, is that each application runs on the same central processing unit in the switching node as the task which implements the protocol serving the communications functions of the node to which that interface talks. This simplifies the design of the interface and ensures that messages cannot be lost between the interface and the task to which it talks and reduces traffic on intra-model buses.

Thirdly, the CPU on which the interface runs is a co-processor rather than a master processor of the node, if possible. This optimizes the amount of memory for data that the interface can use as well as minimizes the impact of the monitoring tasks on call processing tasks in the node.

A fourth architectural characteristic of the monitor applications requires that each interface serves a single monitor application and talks to a single monitor task. This simplifies the design implementation of the interfaces. As mentioned above, if two monitor nodes manage the same switching node, each monitor node will have its own set of interfaces on the switching node.

The detailed implementation of the network topology application (NTA), the database application (DBA), the alarm table application (ATA) and the event application (EVA) are provided below.

VI. Event Application Design

1. Introduction

Figure 6:
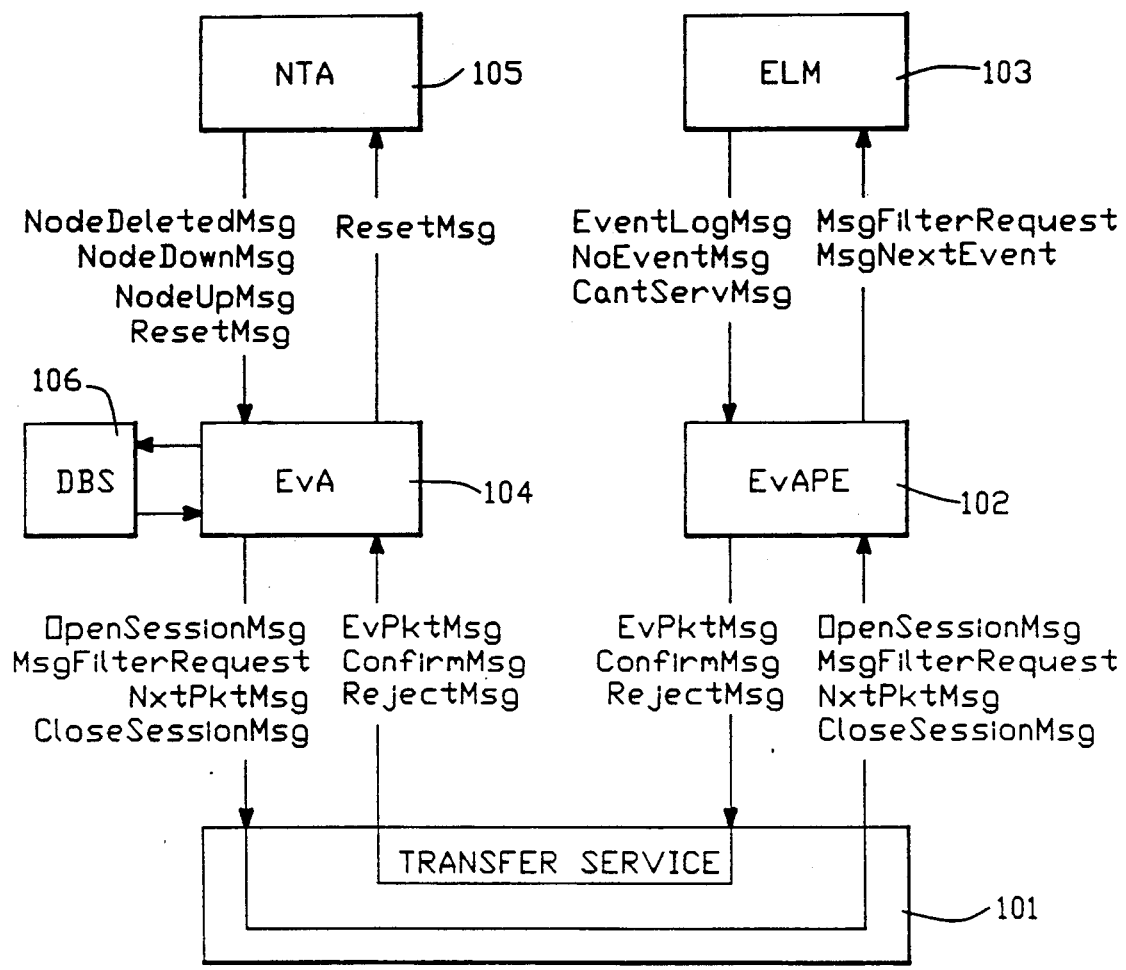
FIG. 6 is a system overview for the event log application, distributed between the monitor node and the switching node.

The event application is a distributed application responsible for collecting the events occurring on the switching nodes in the network illustrated in FIG. 6. It consists of two halves, one (EVA) on the monitor side and the other (EVAPE) on the side of the node network. The monitor part receives the events from the network part and distributes them through the monitor system as necessary.

The monitor side of the event application consists of the event application task EVA 104. The EVA communicates with the network topology application NTA 105 and the monitor database system DBS 106.

On the network side of the event application an event APE task EVAPE 102 is running on each node and is talking to the local event log manager ELM 103.

The EVA 104 on the monitor maintains a session with each EVAPE 102 out in the network to ensure reliable delivery of events. This session concept also allows the EVA 104 to flowcontrol the EVAPEs and thus prevents the monitor node from being flooded with messages from the network.

Furthermore the EVAPEs are able to increase transmission efficiency, decrease network traffic and make efficient use of local buffer space by packaging event messages arriving from the ELM 103 before transferring them to the EVA 104.

2. General System Overview

FIG. 6 gives a general overview of the system to be implemented. It shows the logical modules and the message passing between them. The transfer service 101 provides the transparent message passing between tasks—here the EVA 104 and EVAPE 102. They are not aware of the transfer service 101.

3. The EVAPE 3.1 Required ELM Feature

The design of the event application relies on one functional feature of the ELM 103. It must have the added function of detecting when a wrap occurs and communicate this wrap to its client task, which is the EVAPE 102.

Figure 7:
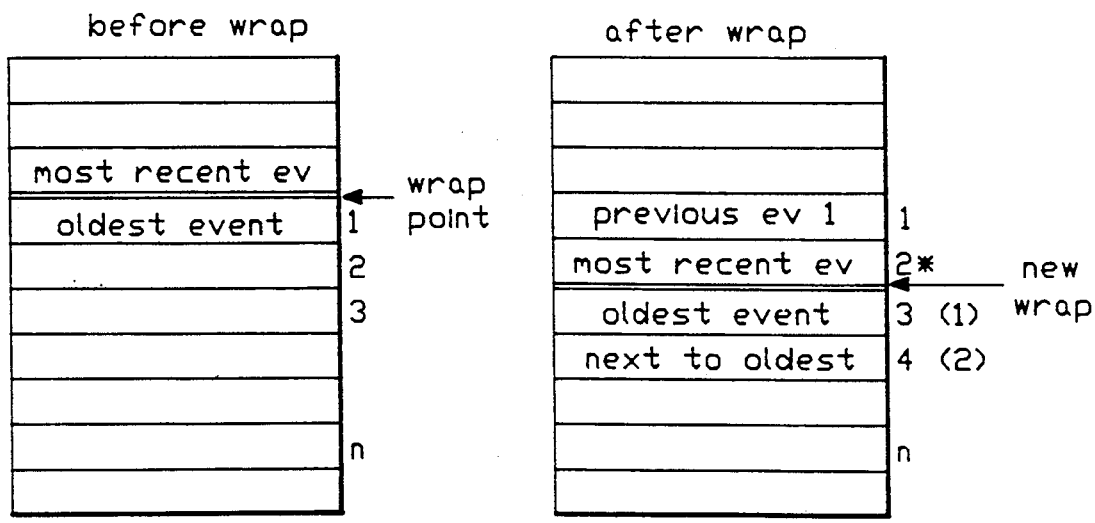
FIG. 7 is a snapshot of the event log on the switching nodes before and after a wrap.

As depicted in FIG. 7, a wrap is here semantically understood as a gap in the chronological sequence of n events out of the event log and presuming it has successfully retrieved event 1 out of n, the ELM 103 might overwrite events 1 and 2, while the EVAPE 102 is waiting for CPU cycles to read events 1 and 2. Thus the next event the EVAPE 102 will get from the ELM 103 once it is running again, is not the event 2 it actually wants, but is an event which is no longer in sequence with event 1 already read. A wrap has occurred.

The ELM 103 must inform the EVAPE 102 of this wrap, which consists of a loss of an unknown number of events, in the flag field of the event log message. The EVAPE 102 itself cannot detect such a wrap.

No other actions except marking the monitor database are taken when a wrap occurs. The lost events due to a wrap are not retrievable.

3.2 EVAPE Packaging Scheme

An EVAPE 102 task communicates with the local ELM 103 on every switching node in the network.

It gets a request to read out of the event log from the peer event application task EVA 104 on the monitor. The EVAPE 102 will then reply with a certain number of events contained in an event packet.

The protocol between the EVA 104 and the EVAPE 102 is discussed in greater detail in section 3.2.

The EVAPE communicates with the ELM in the so-called deferred mode; i.e., events are not asynchronously sent to the EVAPE 102 by the ELM 103. The EVAPE 102 rather requests a single event at a time until a certain number of events is reached, which nicely fit into one packet from the communications tasks of maximum size (900 bytes), or until some other condition occurs (see section 3.2).

This number is determined to be 28 physical event records (28*32 bytes=896 bytes), which translates to a dynamically adjustable number of logical events, depending on the size of each event (1–3 physical records).

Sending such a bundle of events rather than every event as it is retrieved from the log, increases throughput without, however, flooding the monitor node and makes best use of internal buffers, as node memory is allocate in 512 byte chunks minimum.

As indicated above, when receiving an event log message (EventLogMsg) from the ELM, the EVAPE unpacks it; i.e., it basically retrieves the event information (82 bytes), and provided the event tokens are not all used, stores it in a more compact form in the buffer it uses to assemble the message to be sent to the EVA 104 as a response to an earlier request. A "fully loaded" event cannot be compressed and is stored as it comes in EventLogMsg.

The way the EVAPE compresses events is shown in the following FIG. 8.

Figure 8:
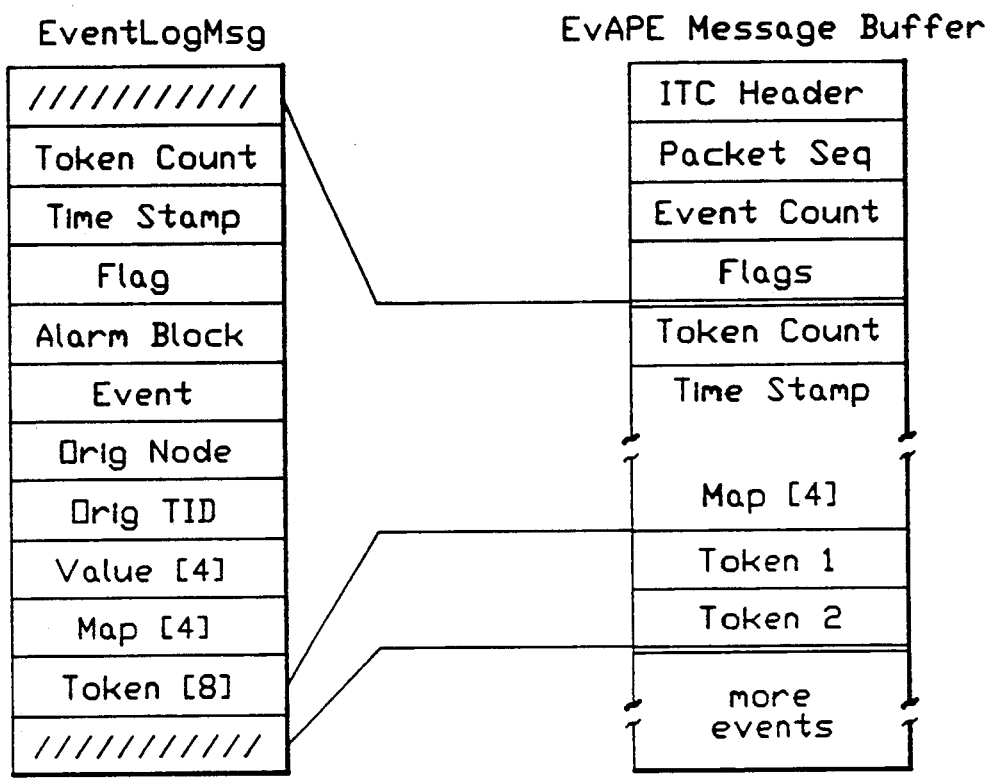
FIG. 8 illustrates the message buffer and compression of data in the buffer that occurs on the event application on the switching node.

FIG. 8 shows an event log message holding an event with 2 tokens. Thus only 2 tokens will be stored in the EVAPE 102 message buffer, saving the space of 6 further tokens (6*6 bytes=36 bytes) which are not used by this event.

3.3 EVAPE Buffering Scheme

When the EVAPE has assembled its event packet and there has been a request from the EVA, it sends it to the EVA on the monitor. During the time which the EVAPE has to wait until it gets the next permission to send from the EVA (here called round trip delay), it starts buffering ahead to generate the next packet. In this way, events can be collected a little faster and the EVAPE is likely to miss fewer events.

There is of course a limit of what the EVAPE 102 can buffer ahead. It will try only to assemble the next packet, because of node memory allocation constraints and because in the average case there are probably not so many events.

The buffer space needed here to assemble the next event packet during round trip delay is 1 KByte. The memory permanently allocated to the EVAPE is 2 KBytes, as The EVAPE must store the packet just sent, but not yet acknowledged (see 4.2.2).

3.4 EVAPE—ELM Protocol Basics 3.4 EVAPE

The EVAPE starts a session with the ELM and EVA receiving an open session message (OpenSessionMsg) from the EVA on the monitor. After the EVA-EVAPE session has been established, the EVAPE starts its communication with the ELM by sending the filter request messages (MsgFilterRequest) which it has received from the EVA to the ELM (see section 4.2.1 for the EVA-EVAPE open session).

The MsgFilterRequests indicate deferred mode, telling the ELM to send a single event at a time until it is polled again.

The ELM returns the first matching event as a response to the last MsgFilterRequest in an Event Log Message (EventLogMsg), if the MsgFilterRequests have all been received in sequence and if there has been enough memory available to ELM to build a filter command block FCB. If there is no matching event, a no event message (NoEventMsg) is returned. If the MsgFilterRequests are out of sequence, or the ELM is out of memory for FCBs, a can't service message (CantServMsg) is returned.

In order to ensure in sequence delivery of MsgFilter Requests, the EVAPE will buffer them as it receives them from the EVA and brings them in order if necessary. This can be done, because the EVAPE knows how many MsgFilterRequests to expect through a parameter in the OpenSessionMsg (see FIG. 9).

The EVAPE requests further events from the ELM through next event messages (MsgNextEvent) returning one event each.

When no event has been logged since the last poll, the ELM will return a no event message (NoEvent Msg).

The events returned by the ELM will all be in sequence unless the event log has wrapped between two MsgNextEvent, in which case the ELM will give a notification in the flag field of the EventLogMsg.

The EVAPE must keep a timer for its relation with the ELM. It must time out when the EVAPE does not receive a response to a message from the ELM. This is an indication that the ELM is possibly no longer alive. The EVAPE retries up to two times to send its message, until it either receives a response or informs the EVA of the situation (ELM crash flag in the flag field of the event packet message).

The death of the ELM is potentially coupled with a loss of events, because although they might occur, they cannot be logged. Apparently the event log buffer is not cleared.

When the ELM is resurrected, the EVAPE must establish a new session with it, because the ELM, of course, does not recall anything (no FCB.). The EVAPE receives its session parameters (MsgFilterRequests) as a response from the EVA to the EVAPE's notification, because a new EVAPE-ELM session implies a reinitialization of the EVA-EVAPE session.

The time out used by the EVAPE to detect a failed ELM is to be chosen smaller than the timeout used in the EVA-EVAPE protocol.

4. The EVA

4.1 EVA Generals

The monitor event application task (EVA) runs on the monitor and maintains a session with each EVAPE in the node network.

The EVA collects the events from each node as the EVAPEs send them. It records all events in the monitor database DBS. Basically the event type and subtype must be translated into meaningful information for query and report generating purposes. The EVA only stores the event records in their raw form in the DBS. Event semantics will be provided by a separate application (see section 7 on the EVA-DB interface).

The EVA will have to interface with the monitor network topology application NTA 105, as this application knows when there is a new node coming into the network or whether one has disappeared. The NTA 105 notifies the EVA of either situation.

When a node comes into the partition managed by the monitor (after either a reset or in the case of a new node), the NTA 105 sends a node-up message (NodeUpMsg) to the EVA. Analogously, the EVA receives a node-down message (NodeDownMsg) when a node crashes and a node deleted message (NodeDeletedMsg) when a node is taken out of the partition.

In the first case the EVA must open a session with the EVAPE running on the new node. Prior to this the EVA must remotely create the EVAPE task by sending a create message to that node. In the two latter cases it can stop polling the EVAPE, because the node is no longer reachable or of any interest.

4.2 EVA-EVAPE Protocol

The EVA maintains a session with each EVAPE on the nodes in the network. Each session is initialized through an open session message (OpenSession Msg) by the EVA. The EVAPEs will not be able to initiate a session.

The EVA will supply the filter request messages that the EVAPE needs to start its communication with the ELM. This allows for the flexibility to have the monitor side control which events it wants to store from which node (hardcoded).

4.2.1 Opening Sessions

The EVA will open all sessions with a sequence of open session messages and wait for response packets from all EVAPEs. This could cause, in a 32-node network, 32 event packets to arrive at the monitor node almost simultaneously, if the links permit. However, the EVA will accept only one packet at a time.

The OpenSessionMsg has as parameters the number of filter request messages (MsgFilterRequest) following (FilterCount) and, as an unused field, the number of event packets the EVAPE is permitted to send upon a request from the EVA (PktGrant). This number is one. See FIG. 9 for the structure of an OpenSessionMsg.

Responses from EVAPE of event packet per OpenSessionMsg (PktGrant=1), provides inherently for in-order delivery and is therefore easily implemented. Two or more outstanding packets would require a window mechanism but would offer the flexibility of granting a larger window size to remote nodes to enhance performance. This might be desirable in alternative embodiments.

After having received an OpenSessionMsg, the EVAPE will confirm by sending a confirm message (ConfirmMsg). The structure of the ConfirmMsg is depicted in FIG. 10. It has a field (PktSeqNbr) which holds the sequence number of the last event packet sent (for consistency checking). As a response to an Open- SessionMsg, PktSeqNbr in the ConfirmMsg will be zero.

When the EVA does not receive a ConfirmMsg from the EVAPE it does not try to send the MsgFilterRequests. Rather, it times out and re-sends the OpenSessionMsg according to the usual retransmission and timeout scheme described below. When it does get a ConfirmMsg, it subsequently sends the number of MsgFilterRequests specified in the OpenSessionMsg.

This also covers the case of lost MsgFilterRequests. If the EVAPE does not respond, the EVA will time out and recover from there.

The EVAPE confirms the receipt of all MsgFilterRequests by sending another ConfirmMsg (PktSeqNbr 0). When the EVA does not receive one, it again acts according to the overall retransmission scheme.

The open session phase is completed when the EVA receives this ConfirmMsg. It will immediately enter the packet transfer phase by requesting the first packet through a next packet message (NxtPktMsg).

4.2.2 Transferring Event Packets

The EVA requests a packet from the EVAPE through a next packet message (NxtPktMsg) illustrated in FIG. 11.

The NxtPktMsg has a parameter packet sequence number (PktSeqNbr) which holds the sequence number of the expected packet. The PktSeqNbr is manipulated as follows:

If PktSeqNbr is the sequence number of the next packet expected, the next packet in sequence is requested and the previously received packet with PktSeqNbr-1 is acknowledged.

If PktSeqNbr is the sequence number of the last packet received, the retransmission of the last packet sent is ordered.

While the EVAPE is waiting for the NxtPktMsg from the EVA, it keeps polling the ELM for events and assembles the next packet, as described in chapter 2.2. When the NxtPktMsg arrives, the EVAPE can send this packet immediately as a response, provided the PktSeqNbr matches that of this packet.

If the NxtPktMsg is a retransmit message, the EVAPE sends again the last sent packet, which is stored for that very purpose until it has been acknowledged.

Thus the EVAPE permanently keeps two event packets, the last sent and the next to send. This uses 2 KBytes of buffer space.

Figure 13:
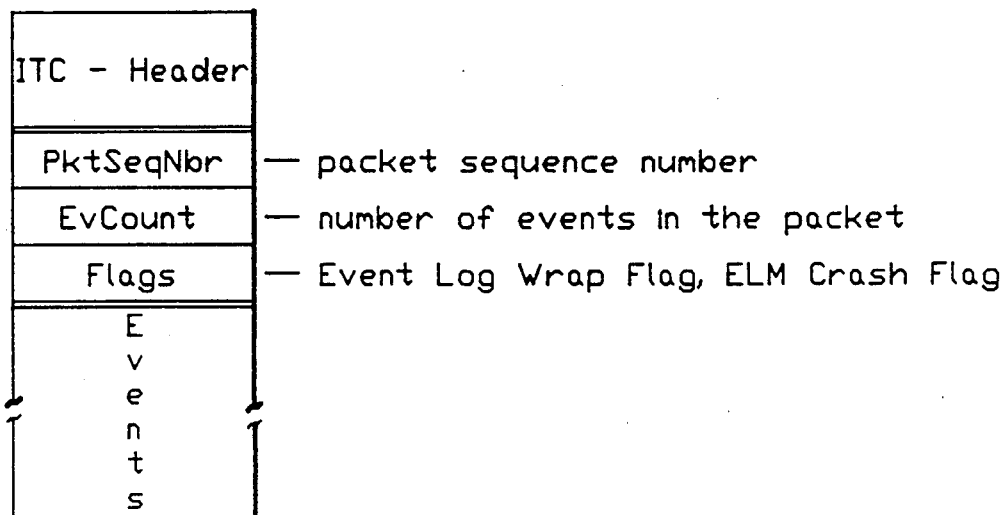
FIG. 13 illustrates the event packet message structure for the event application.

The format of the event packet message (EVPktMsg) as it is sent from the EVAPE to the EVA is shown in FIG. 13.

The EVA must keep a timer in its relationship with the EVAPE to detect lost event packets on the links (PktTime). The problem is how to determine the value of this timer, which is different for each EVA-EVAPE session and depends on the network topology and routing tables. As packets are rarely lost, however, PktTime can be chosen generously large so that the same value can be used for all sessions independently of the path length.

In a 32-node network a PktTime of one minute should be large enough to handle the longest path case without causing too long delays in the average path case.

4.2.3 Retransmission Scheme

When the EVA does not receive a response to a NxtPktMsg from the EVAPE during PktTime, it will retransmit the NxtPktMsg without incrementing the PktSeqNbr, up to twice (total of three tries).

When at that point it still has not received an EVPktMsg, the EVA has to assume that either the EVAPE has just crashed, the node has reset, or that the HDLC link connecting the monitor to the network has gone away. Anyway, the EVA has lost connectivity with the EVAPE for some reason. The recovery mechanism is the same in either case.

The EVA closes its session with the EVAPE. It then checks if it received a NodeDownMsg or NodeDeletedMsg from the NTA 105. If yes, it will not open a new session with the EVAPE until it gets a NodeUpMsg from the NTA 105 for that node. If no, it immediately tries to re-open the session just closed by sending an OpenSessionMsg.

The presented scheme is not only valid in the case of no response to a NxtPktMsg. Whenever the EVA timesout because of a no response to any message, the same recovery mechanism applies.

The EVA has to mark the DBS when it loses connectivity to an EVAPE, because potentially events have been lost.

If the EVA crashes itself, it will reinitialize all sessions with the EVAPEs as when it comes up for the first time. The DBS must be marked accordingly.

4.2.4 Closing Sessions

In the previous section, it was mentioned that the EVA will close its sessions with an EVAPE when it is no longer reachable, i.e., when PktTime expires three times in sequence or when the EVA receives a NodeDownMsg or NodeDeletedMsg from the NTA 105.

The EVA also closes a session when it receives an EvPktMsg with the ELM crash flag set, indicating that the EVAPE gets no more response from the ELM. The EVAPE has gone through its own recovery scheme prior to sending this message.

The closing of a session only involves a message to be sent when a node has been deleted off the partition of the network controlled by the monitor and the EVA still has connectivity with the EVAPE. In this case, the EVA sends a close session message (CloseSessionMsg) to the EVAPE for housecleaning purposes. The CloseSessionMsg has as a parameter the sequence number of the last EvPktMsg received (see FIG. 12 below).

5. Finite State Model

EVAPE

Figure 15:
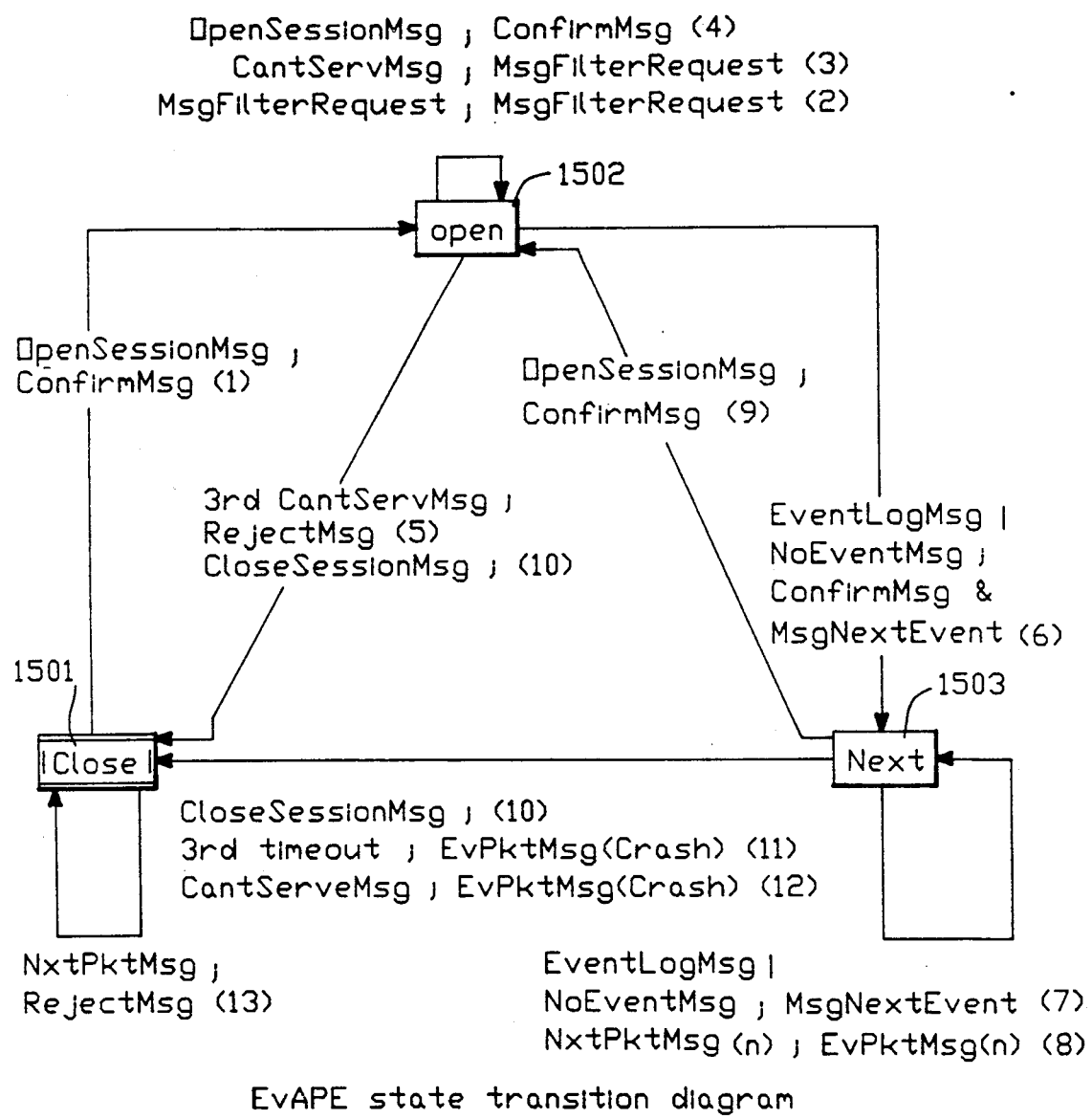
FIG. 15 is a state transition diagram for the portion of the event application running on the switching node.

The following FIG. 15 shows the EVAPE state diagram. The EVAPE finite state space has three states, "close" 1501, being the initial state. The state diagram shows the input messages that determine a transition condition. For legibility reasons it is not mentioned where the messages "enter" or "leave" the state machine (i.e., message queues). Also, additional transition conditions and actions are not included in the figure.

1. When the EVAPE is started it is in its initial state "close" 1501 and waits for an OpenSessionMsg from the EVA. The EVAPE confirms the receipt by sending a ConfirmMsg to the EVA and switches to the "open" state 1502.

2. In the "open" state, the EVAPE expects a number of MsgFilterRequests from the EVA. This number has been specified as a parameter in the foregoing OpenSessionMsg. The EVAPE stores all incoming MsgFilterRequests which may arrive in disorder. It brings them in sequence before forwarding them to the ELM. When a MsgFilterRequest is lost on the way from the EVA, the EVAPE waits for it to arrive. It does not forward the MsgFilterRequests to the ELM until it gets all of them (see section 6 EVA protocol machine). The EVA stays in the "open" state 1502.

3. After having forwarded all the MsgFilterRequests to the ELM, the EVAPE will get back a response. If this happens to be a CantServMsg, the ELM most probably cannot momentarily find memory to allocate a filter command block FCB. Therefore the EVAPE tries up to twice more to send the MsgFilterRequests. Its state remains "open" 1502 until the third CantServMsg (see 5).

4. If the EVAPE receives the OpenSessionMsg in the "open" state 1502, it confirms by sending a ConfirmMsg to the EVA. It stays in the "open" state 1502.
N.B.: The OpenSessionMsg most probably has been originated by a different EVA.

5. When the EVAPE gets the third CantServMsg, it gives up and sends a RejectMsg to the EVA. It changes its state to "close" 1501.

6. Like in (3) the EVAPE has been waiting for a response from the ELM after having forwarded all MsgFilterRequests. This time the ELM responded with either an EventLogMsg or a NoEventMsg. In any case the EVAPE confirms and completes the open phase by sending a ConfirmMsg to the EVA. At the same time it requests a further event from the ELM by sending it a MsgNextEvent. The EVAPE switches to the "next" state 1503.

7. If in the "next" state 1503, the EVAPE receives an EventLogMsg or a NoEventMsg from the ELM, it keeps polling the ELM through a MsgNextEvent. Only when its buffers are full does it stop polling. The EVAPE resumes polling as soon as it has a free buffer. This happens when it receives a NxtPktMsg from the EVA acknowledging the EVAPE's previously sent EVPktMsg. The EVAPE keeps its current state.

8. When the EVAPE gets a NxtPktMsg from the EVA in the "next" state 1503, it responds with an EvPktMsg having the PktSeqNbr expected by the EVA and indicated in the NxtPktMsg. This can be a retransmission or a new EvPktMsg.

If the expected PktSeqNbr in the NxtPktMsg is the same as the PktSeqNbr in the last sent EvPktMsg, the EVAPE retransmits this last packet. It does not increment its current internal PktSeqCount (initially one).

If the expected PktSeqNbr matches the EVAPE's next PktSeqNbr to be sent (current PktSeqCount), the EVAPE sends an EvPktMsg having this PktSeqNbr. It increments its PktSeqCount (modulo 2) and frees the buffer containing the last sent and now acknowledged EvPktMsg. Thus it has memory to assemble the next EvPktMsg.

If the EVAPE does not have any events when it gets a NxtPktMsg, it does not respond. Only after having received the third NxtPktMsg asking for the same PktSeqNbr, will it send an EvPktMsg with zero events and having the required PktSeqNbr. This scheme requires the least messages to be exchanged between the EVAPE and the EVA when there are no events to report. The EVAPE has to respond the third time, because the EVA resets its session after three tries (assuming the EVAPE is not reachable).

9. When the EVAPE is in the "next" state and receives an OpenSessionMsg, it responds by sending a ConfirmMsg and changes its state to "open." The OpenSessionMsg has most probably been originated by a different EVA on another monitor than the one the EVAPE was talking to until now. This can occur when the monitor is unplugged without shutting the system down cleanly. When another monitor (or even the same) is hooked up again to the network, the EVAPE will still be running unless this node has been taken down. Therefore it has to accept an OpenSessionMsg in the "next" state 1503.

10. The EVAPE might get a CloseSessionMsg in the "open" 1502 or "next" states 1503, which leads to a state change to "close" 1501. The node where the EVAPE runs has been deleted out of the network partition managed by the monitor. Therefore the EVA closes its session with the EVAPE.
N.B.: This tells the EVAPE no longer to poll the ELM and to free its buffers. Thus it does not use any CPU or RAM while its node is no longer managed by the monitor. The same result is achieved by letting the EVAPE have a long timer. When this timer expires and the EVAPE has not heard from the EVA so far, it will close the session, assuming that its node has been removed from the partition. The EVAPE does the same clean-up as mentioned before.

11. When the EVAPE does not get a response from the ELM to a MsgNextEvent, it will retry up to two more times. If it still does not get anything back, it assumes that the ELM is no longer reachable (i.e., has crashed). The EVAPE then notifies the EVA by responding to the NxtPktMsg by an EvPktMsg with the ELm crash flag set.

12. If the EVAPE receives a CantServMsg from the ELM in the "next" state, this means that the ELM lost the FCB (probably after a crash). Therefore the EVAPE stops polling the ELM through MsgNextEvents and responds with an EvPktMsg that has the ELM crash flag set to the NxtPktMsg. It changes its state to "close" 1501.

13. The EVAPE has just reset and is in its initial "close" state 1501. When it gets a NxtPktMsg, the EVA has not yet noticed the reset. So the EVAPE sends a RejectMsg to tell it.
N.B. The EVAPE alternatively could just ignore the NxtPktMsg while in "close" 1501. After a third NxtPktMsg without a response, the EVA would reopen the session anyway. But the RejectMsg makes this happen sooner.

The following messages can be ignored in the following states (i.e., the EVAPE takes no action and drops them) and are therefore missing in the state diagram in the respective places.

a) in "close" 1501
EventLogMsg from ELM (only possible after EVAPE crash)
NoEventMsg from ELM (only possible after EVAPE crash)
CantServMsg from ELM (possible after ELM crash)
MsgFilterRequest from EVA (can only come from different EVA/MONITOR b) in "open" 1502
NxtPktMsg from EVA (can only come from different EVA/MONITOR)

c) in "next" 1503
MsgFilterRequest (can only come from different EVA/MONITOR).

6. EVA Finite State Model

Figure 14:
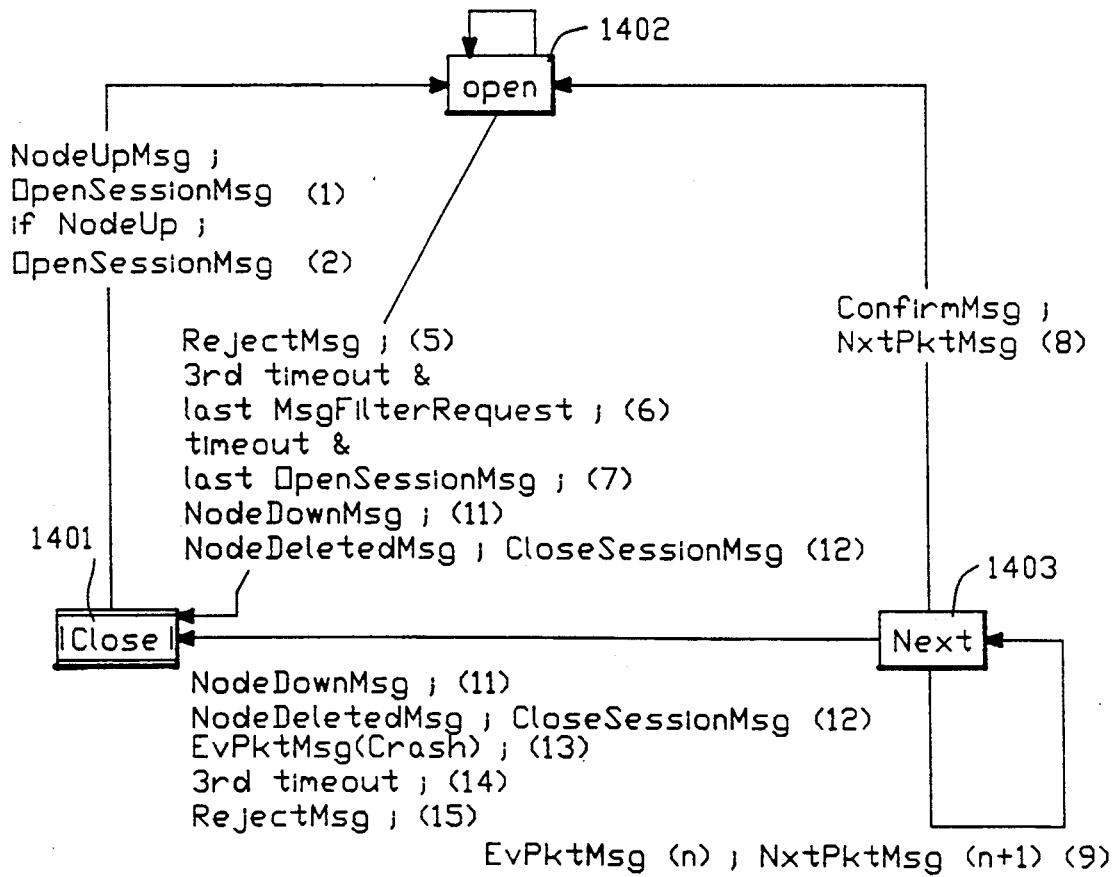
FIG. 14 is a state transition diagram for the event application running on the monitor node.

FIG. 14 shows the EVA protocol state machine. Actually the EVA is a multiple finite state machine, allowing one automaton for every node managed by the monitor, as it has to keep a session with every EVAPE on those nodes. In the figure only one of those state machines is shown, representing a specific EVA-EVAPE session. The finite state space has three states, "close" being the initial state. The input messages come either from the EVAPE or the NTA 105. The output messages are all sent to the EVAPE as actions to the respective transitions.

1. A particular session is in its initial "close" state 1401. The EVA receives a NodeUpMsg from the NTA 105 telling it that the node this session relates to has come up. It allocates a session control block SCB for the EVAPE running on that node and opens a session with it by sending an OpenSessionMsg. The EVA changes the session's state to "open" 1402.

2. The EVA has just closed its session with one EVAPE and is in the "close" state 1401 for that session. If the node the EVAPE is running on is still up (e.g., the reason for closing was an ELM not reachable), the EVA reopens the session by sending an OpenSessionMsg and putting the session again in the "open" state 1402.

3. The EVA-EVAPE session is in the "open" state 1402. The EVA waits for a ConfirmMsg from the EVAPE to confirm the receipt of the OpenSessionMsg. When it gets the ConfirmMsg, the EVA sends the number of MsgFilterRequests that have been indicated in the OpenSessionMsg to the EVAPE (see also (7)).

4. After having sent the last MsgFilterRequest the EVA waits for a ConfirmMsg or Reject Msg from the EVAPE, indicating that all MsgFilterRequests have arrived (see (8) and (5) respectively).

When the EVA does not receive a ConfirmMsg before the timeout expires, it assumes that one or more MsgFilterRequests have been lost. Therefore it retransmits the MsgFilterRequests up to two more times (see also (6)).

5. The EVA gets a Reject Msg from the EVAPE in the "open" state 1402. This means that the ELM responded negatively to the Filter Request supplied (see EVAPE state diagram (5)). The EVA closes the session by changing the session's state to "close" 401.

6. If the EVA times out three times in sequence while waiting for a response confirming its MsgFilterRequests, it switches to the "close" state 401 for that session.

7. If the EVA does not receive a ConfirmMsg before its timeout PktTime expires, it changes this session's state to "close" 1401 and recovers from there.

8. When the EVA eventually receives a ConfirmMsg from the EVAPE as a response to all MsgFilterRequests arrived and filter ok, it sends the first NxtPktMsg to the EVAPE requesting an EVPktMsg with expected PktSeqNbr1. At the same time, the EVA sets its timer PktTime. This opens the packet transfer phase. The EVA puts the session into the "next" state 1403.

9. Whenever the EVA receives an EvPktMsg with the expected PktSeqNbr in the "next" state 1403, it increments its internal PktSeqCount (modulo 2) and asks the EVAPE for a subsequent EvPktMsg by sending another NxtPktMsg with PktSeqNbr equal to PktSeqCount. The EVA resets its timer PktTime and stays in the "next" state 1403.

10. When the EVA times out while waiting for an EvPktMsg, it asks for a retransmission of the same, assuming that the packet has been lost. It resets the timer and keeps the current state. It does not increment its PktSeqCount (also see (14)).

It might be possible for the EVA timer to expire when the EvPktMsg has not been lost, but is terribly late. In such cases the aforementioned retransmission has generated a duplicate. Therefore the EVA discards an EvPktMsg with a PktSeqNbr it has already received.

11. The EVA receives a NodeDownMsg (for the node the EVAPE runs on) from the NTA in the "open" 1402 or "next" state 1403. It closes the session by making its current state "close" 1401.

12. The EVA gets a NodeDeleted (for the node the EVAPE runs on) from the NTA 105 when a node is taken out of the network managed by the monitor. The EVA therefore makes some housecleaning by sending a CloseSessionMsg to the EVAPE. It changes its state to "close" 1401.

13. If the EVA receives an EvPktMsg with the ELM crash flag set, it closes its session with the EVAPE by switching to the "close" state 1401. The EVAPE changed its state to "close" 1501 when sending the EvPktMsg.

14. If the timer PktTime has expired three times in sequence, while the EVA is waiting for an EvPktMsg, it closes its session with the EVAPE internally by changing its state to "close" 1401.

Very late EvPktMst which might have caused the timer to expire three times will be discarded by the EVA in the "close" state 1401.

15. The EVAPE could have reset after having sent an EvPktMsg to the EVA. When the EVA receives the EvPktMsg, it requests a further packet through a NxtPktMsg. The EVAPE will respond to this by a RejectMsg, because it is in its "close" state 1501 after the reset. Upon receipt of the RejectMsg, the EVA (also) goes to "close" 1401.

The following are the messages that can be dropped by the EVA depending on the session's state.

1. in "close" 1401
NodeDownMsg from NTA 105 (no-op, session already closed)
NodeDeleteMsg from NTA 105 (no-op, session already closed)
EvPktMsg from EVAPE (only possible after EVA crash or late packets from just closed session)
RejectMsg from EVAPE (only possible after EVA crash)
ConfirmMsg from EVAPE (EVA has probably crashed in open phase)

2. in "open" 1402
NodeUpMsg from NTA 105 (not likely, but wouldn't hurt, as session is already open)
EvPktMsg from EVAPE (impossible)

3. in "next" 1403
NodeUpMsg from NTA 105 (not likely, but wouldn't hurt, as session is already open)
ConfirmMsg from EVAPE (impossible)

7. EVA - DBS

The EVA interfaces with the monitor database DBS by means of a function call to record all events it receives from the EVAPEs into the DBS.

Figure 16:
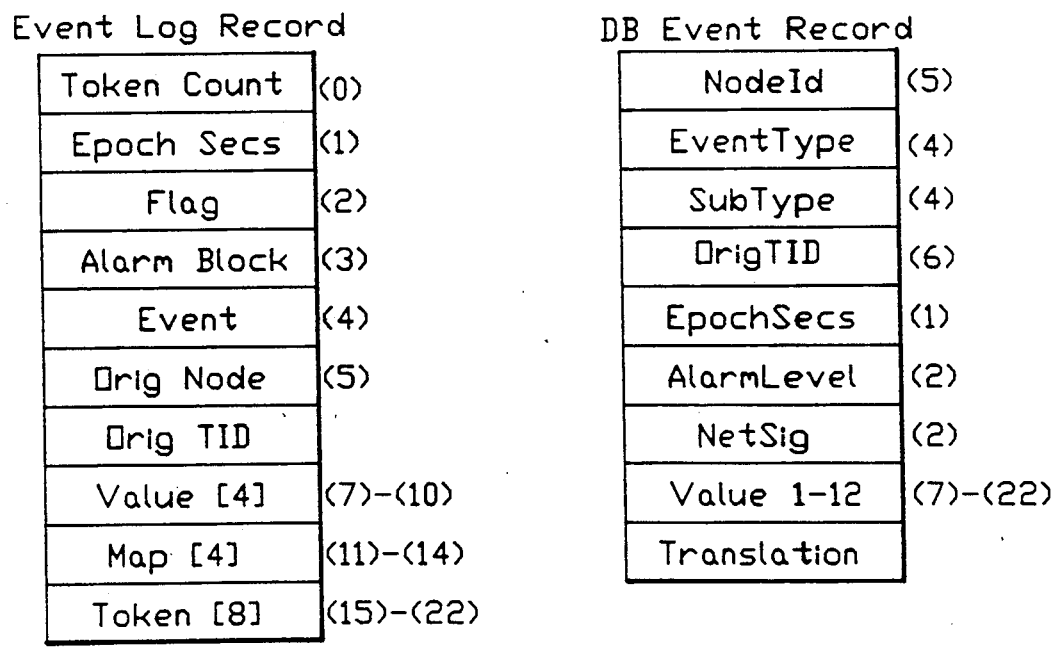
FIG. 16 illustrates the format for storing event records on the, switching node and on the monitor node.

Basically the EVA translates the structure of an event log record as it comes in an EvPktMsg into the structure of the event record in the DBS. This is quite a straightforward process. It is illustrated in FIG. 16.

At startup the EVA calls a function that returns a table mapping the node numbers into DBS wide unique NodeIds. One node might be configured for several networks and thus its node number is not unique from the DBS's point of view. A unique NodeId has to be filled into every DBS event record by the EVA.

The EVAPE on the node has to convert the time stamp of each event into an absolute time (epoch secs). This is necessary, because the time bases of any two nodes are potentially different. Hence, on the monitor two event time stamps from two different nodes cannot be compared without conversion to absolute times.

The tokens of an event have are translated into meaningful information for querying or report generating purposes. This can be done via a function call in the EVA or by a separate process either before storing the events into the monitor DBS or at retrieval time.

As the event text string takes up a lot of disk space when stored in the DBS, the translation should probably be done whenever events are retrieved. An application process could be invoked by the user that accepts SQL statements, forwards them to the DBS and runs a translation function over the raw event information returned before displaying it to the user.

A wrap in the sequence of events from one node is entered into the DBS is a gap record, which basically is a normal event record having an event type field of "event log gap" and where the fields for the node-id and the time stamp have been filled in.

In a similar way the loss of connectivity to the ELM of a node is entered into the DB as a potential loss of events. As it is not certain that events have been lost during the time of no connectivity, so a different event type will be used, like "unknown state."

VII. Alarm Table Application
Introduction

The purpose for the alarm table application ATA is to collect and distribute the active alarms in the network.

The ATA collects alarms from the IDNX alarm logs, which are created and managed by the IDNX event log manager ELM task. An alarm table APE (ATAPE) is created in each IDNX node to monitor alarm log changes, and to send these changes in response to queries, to the monitor ATA task. The monitor network topology application NTA informs the ATA about the state of the nodes monitored.

Alarms are distributed to the monitor menu and graphics interface console application MAGIC, and to the monitor network alarm monitor NAM applications. MAGIC uses this information to assign color dynamics, indicating alarm state, to its graphic representations of the network's components. NAM displays the alarm information in a scrollable Suntools text-subwindow. The ATA does not store alarm information in the ORACLE database.

It is worth noting that a reasonable alternative to this scheme would have been to receive alarm information from the monitor event application EVA, which similarly collects events from the IDNX event logs. (The IDNX alarm log is derived from the event log). This approach would have eliminated the ATAPE, and placed a greater burden on the EVA and its associated EVAPEs. In consideration of a number of difficult synchronization problems between the IDNX and monitor views of current alarm state, this approach was considered a second choice. The synchronization issues are:

1. Recovery from the inevitable "event log wrap" problem required a mechanism to collect alarm tables to recover lost information. This introduced several hairy synchronization problems.

2. The ATA's dependence on EVA would restrict the EVA's freedom to apply filters to event collection for the purpose of reducing network traffic.

3. The ELM would have to be modified to report alarms which were manually cleared by the operator.

4. The monitor would have to recognize the "alarm-clearing" events. This is redundant with the ELM logic which maintains the alarm table.

2. External Reference Specification

Figure 17:
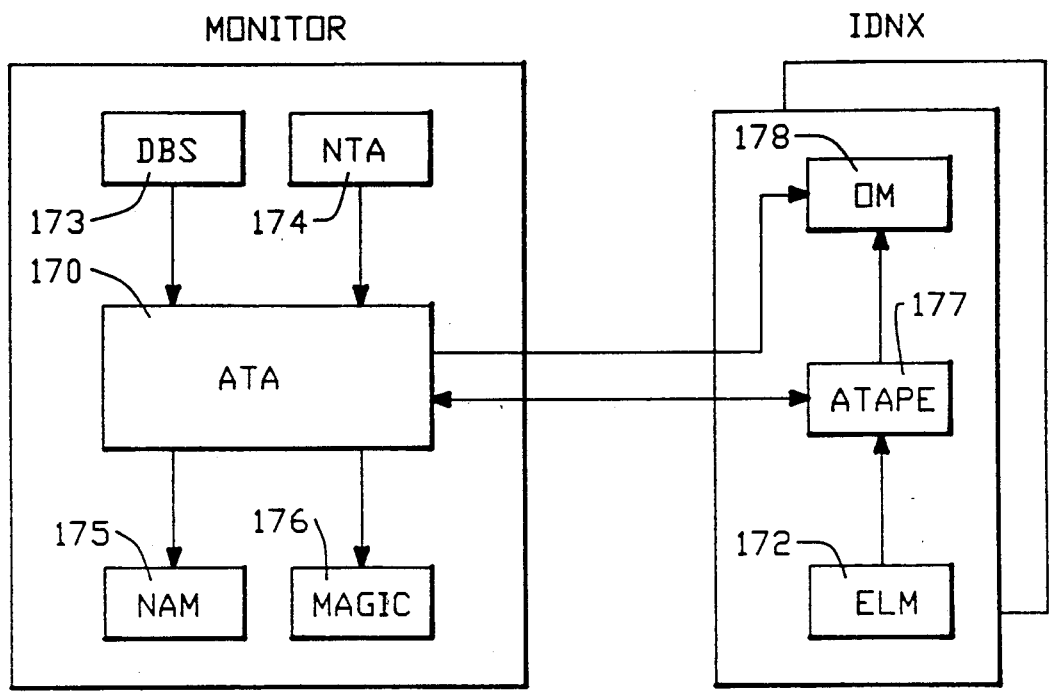
FIG. 17 is a data flow diagram for the alarm table application on the monitor node and the plurality of switching nodes.

FIG. 17 illustrates the logical relationship between the ATA 170 and the other processes it communicates with, as well as the data flow between the IDNX event log application ELM 172 and those applications to which the ATA distributes alarms.

On the monitor node, the ATA communicates with the ORACLE database management service 173, the network topology application NTA 174, a network alarm monitor NAM 175 and a menu and graphics interface termed MAGIC 176. In the IDNX nodes distributed in the network, the attached processor executor for the alarm table ATAPE 177, supports a protocol with the ATA on the monitor node. In addition, the object manager OM 178 on each of the IDNX nodes is requested to create and delete the ATAPE by messages from the ATA 170 and the ATAPE 177, respectively.

The ATA/ATAPE's external interfaces are described in this section. Discussion of the ATA and ATAPE internal design is described in Section 3.

2.1 ATA and ATAPE interfaces to the OM

The IDNX object manager OM is responsible for creating and deleting IDNX tasks. It is therefore requested to create and to delete the ATAPE.

When the ATA is informed by the NTA than an IDNX node is to be monitored, it sends a CREATE_MSG to the OM on that node. There is no response to this message, therefore, the ATA will assume that the task has been started. If the open-session protocol with the ATAPE fails, the ATA will try to create the APE task again.

The ATA sends the CREATE_MSG to the CO-PROCESSOR_PREFERRED_INSTANCE of the OM, so that the ATAPE will be created on an IDNX co-processor if one is available. The intent is to minimize the impact on the IDNX master CPU.

When the ATA is informed by the NTA that an IDNX node is no longer being monitored, then the ATA will delete its ATAPE on that node. Since the ATA does not know which CPU the APE is running on, and since the OM Delete_MSG must be sent to the OM which created the ATAPE, the ATA requests the ATAPE to send the DELETE-MSG to the OM. There is no response to the DELETE-MSG; the ATAPE will continue to run until the OM receives the message, and preempts and deletes the task. If the ATAPE deletion should fail (e.g., the ATA's message to the APE is lost), then the ATA will try to delete the APE again.

The ATAPE task will be re-created by the ATA if either the ATAPE abnormally ends or the CPU it is running on resets. This is part of the ATA-ATAPE error recovery protocol described in the Internal Reference Specification.

Multiple monitor workstations per IDNX network can be supported with the restriction that only one monitor is connected to any given IDNX node. To simplify the design and implementation of the monitor APEs, each monitor creates its own unique set of APE tasks on each node which is being monitored. All IDNX tasks are designated by a generic task id, and a unique task instance; these values are specified in th OM CREATE and DELETE messages. The monitor APE instances are derived from th node number of the IDNX node to which the monitor is connected. This ensures that each APE task will be created with a unique instance, and that it will communicate with a single monitor.

2.2 The ATAPE Interface to the ELM

The ATAPE collects alarm information from the ELM U alarm log. When the ATA opens a "session" with the ATAPE, the ATAPE will copy the ELM's alarm log into a local alarm table, and also into a message(s) to be sent to the ATA. The ATAPE then queries the alarm log "summary" information to detect changes (cleared, altered, or new alarms) to the alarm log. When a change is detected, the ATAPE will re-read the alarm log, posting changes both to its alarm table and to the ATA.

The ATAPE reads the ELM alarm log using the EVENTLOG_ALARM_TABLE message. The ATAPE sends this message to the ELM, specifying an offset into the table, and the ELM returns the message containing eight alarms starting at that offset. This exchange continues until the entire alarm log has been read.

The ELM maintains "summary" information associated with the alarm log. This summary information is queried using the EVENTLOG_ALARM_SUMMARY message. The ELM responds by copying the summary information, including a grand total of active and total alarms, into the message and returning it. The ATAPE compares the two grand total values with the totals retrieved from its last summary query. If the summaries have changed, then the ATAPE reads the new alarm table; otherwise it waits a bit and queries the summaries again. The ATAPE continues to query summary information, and to update its copy of the alarm log until it is deleted by the ATA.

If the ATAPE is created on the master CPU, then it communicates with the master ELM task. If the ATAPE is created on a co-processor, then it communicates with the shadow ELM task. The interface to these two tasks is essentially identical.

2.3 ATA Interface with MAGIC

The ATA distributes the alarm information collected from the ATAPE tasks to MAGIC. MAGIC expects to be informed of only the most critical alarm on a particular network component if that component is triggering multiple alarms. Once an alarm has been reported to MAGIC, MAGIC expects to be informed of any alarm state change on the component, including the clearing of all alarms. When MAGIC is informed by the DBA process that there is a new network component, it will query ATA for the alarm information on that component.

As alarm information is collected from the ATAPE tasks, ATA distributes the information to MAGIC in some number of GI_STATUS_MSGs. This message includes the network component's device id in ASCII format (e.g., NxxCyy.zz), and its current alarm state. Multiple device-id/alarms records are placed in a single message as long as there is room (up to MAX_SCLP_MSG_SIZE). The alarm level values reported to MAGIC are:

1. => cleared alarm
2. => informational alarm
3. => minor alarm
4. => major alarm
5. => critical alarm Until ATA reports alarms to MAGIC, MAGIC will assume that there are no alarms in the network; thus, the initial alarm state of the network is a "cleared" alarm state. When the ATA program (re)starts, it performs a handshake with the MAGIC application (if MAGIC is running) which ensures that MAGIC initializes all alarm states to a "cleared" alarm state. This way, the programs re-synchronize their view of alarm state for all network devices. The handshake is composed of a GI_STATUS_MSG from ATA with device id set to "ALL", and alarm level set to "cleared alarm", followed by a GI_RESENDALL_MSG from MAGIC requesting the ATA to send the current alarm state of all alarming network components. As the ATA collects alarms from the ATAPEs, this information is sent to MAGIC.

When MAGIC (re)starts, it will send the ATA a GI_RESEND_SPEC_MSG, requesting the current alarm state of all alarming network components.

MAGIC queries specific alarm information from the ATA with a GI_RESENT_SPEC_MSG. This message contains a list of network component device ids for which MAGIC wants the current alarm state. The ATA responds with some number of GI_Status_MSGs.

The ATA validates the GI_RESEND_SPEC_MSG from the MAGIC application. If any information in the message has been detectably corrupted, the ATA logs an error message to the monitor system message window.

The ATA is responsible for discriminating between IDNX digroup and port devices. The alarm records collected from the ELM do not make this distinction. The ATA modifies the device id if the alarm is a port alarm to the form NxxCyyPzz. If the alarm is a digroup alarm, the form NxxCyy.zz is used.

2.4 ATA Interface to NAM

The ATA distributes the alarm information collected from the ATAPE tasks to NAM. NAM expects to be informed of all active alarms, all modified active alarms (e.g., when the alarm is re-triggered, certain alarm record information such as the count field is modified), and all active alarms which have been cleared. NAM displays most of the information contained in the alarm records received from the ATAPE tasks in a Suntools textsubwindow.

As alarm information is collected from the ATAPE tasks, ATA distributes the information to NAM in some number of NAM_UPDATE_MSGs. This message includes the alarm record structure retrieved from the ELM alarm logs, and a function to perform relative to the alarm. Multiple alarm record/function sets are placed in a single message as long as there is room (up to MAX_SCLP_MSG_SIZE). The functions passed to NAM are:

NAM_ADD => to add the alarm to the text-subwindow.
NAM_MODIFY => to modify an alarm already displayed in the text-subwindow.
NAM_DELETE => to delete an alarm from the text-subwindow.

Until ATA reports alarms to NAM, NAM will assume that there are no alarms in the network; thus, the initial alarm state of the network is a "no" alarm state. When the ATA program (re)starts, it performs a handshake with the NAM application (if NAM is running) which ensures that NAM clears all alarms which are currently displayed in its text-subwindow. In this way, the programs re-synchronize their view of the alarm state for the network. The handshake is composed of an ATA_RESET_MSG from ATA, followed by a NAM_RESET_MSG from NAM requesting the ATA to send all currently active alarms which it has collected. As the ATA collects alarms from the ATAPEs, this information is sent to NAM.

When NAM (re)starts, it will send the ATA a NAM_RESET_MSG, requesting all currently active alarms which have been collected by the ATA.

The ATA is responsible for discriminating between IDNX digroup and port devices. The alarm records collected from the ELM do not make this distinction. The ATA modifies the device id in the alarm record structure, by setting Bit 30 of the ElmNetAddr field on if the alarm is a digroup alarm.

The ATA is responsible for informing the NAM when a node is deleted from the monitor domain. This is done by sending the NAM a NAM_DELETE_NODE_MSG containing the number of the node which has been deleted.

2.5 ATA Interface to NTA

The monitor network topology application (NTA) informs the ATA when the status of an IDNX node which is monitored by the monitor has changed. This includes the addition of a node to the network, the deletion of a node from the network, and the loss of, or gain in, connectivity to a node in the network.

When the ATA (re)starts, it sends the NTA and ATA_RESET_MSG (it it is up). The NTA responds with an NTA_NODES_IN_NET_MSG, informing the ATA of the node number of the IDNX node to which the monitor is attached (called the "neighbor node"), and the list of nodes which are currently monitored and to which the monitor has connectivity. The ATA creates ATAPE tasks on each node contained in the list.

Following the ATA's (re)start handshake with the NTA, the NTA will inform the ATA of changes in the status of any node in the network with one of three messages. Each message specifies a single node number. The messages are:

NTA_NODE_UP_MSG=>whenever a new node is added to the monitor domain, or whenever connectivity has been regained with a node which has "gone down."

NTA_NODE_DOWN_MSG=>whenever a node goes down; i.e., connectivity with the node has been broken.

NTA_NODE_DELETED_MSG=>whenever a node is deleted from the monitor domain.

The ATA uses this information to determine which nodes to create ATAPE tasks on, and whether there is any purpose in trying to communicate with an ATAPE task with which it currently has a session. When a NODE_DOWN message is received, the ATA suspends its session with the ATAPE on that node. When a NODE_UP message is received, the ATA either creates a new ATAPE and establishes a session with it, or it resumes an already active session which has been suspended. When a NODE_DELETED message is received, the ATA deletes the ATAPE on that node.

The NTA also informs ATA when the HDLC link to the neighbor node has become unavailable or subsequently available. When the HDLC link becomes unavailable, the NTA sends an NTA_HDLC_LINK_DOWN message, and the ATA suspends all sessions with its ATAPEs.

When the HDLC link becomes available again, the NTA sends an NTA_HDLC_LINK_UP message. This message has the same format as the NTA_NODES_IN_NET_MESSAGE. If the neighbor node number has not changed, the ATA resumes the sessions with the ATAPE tasks on the nodes which are listed in the message. If the neighbor node number has changed, the ATA deletes all the ATAPE tasks which it has created, and recreates ATAPE tasks on the nodes listed in the message, with a new task instance number derived from the new neighbor node number.

When the NTA application (re)starts, it sends the ATA an NTA_RESET_MSG which has the same format as the NTA_NODES_IN_NET_MSG. If the neighbor node number has not changed, the ATA resumes sessions with ATAPE tasks on any nodes from which it had not been collecting alarms previously. If the neighbor node number has changed, the ATA deletes all the ATAPE tasks which it has created, and recreates ATAPE tasks on the nodes listed in the message, with a new task instance number derived from the new neighbor node number.

When the ATA receives an NTA_RESET_MSG, it also reads the Node Table in the ORACLE database which contains the node numbers of the IDNX nodes which are currently defined in the monitor domain. This is done to ensure that no nodes were deleted from the domain while the NTA application was inactive. If the ATA has a session with an ATAPE on any node which is not in the ORACLE node table, then that ATAPE is deleted.

The ATA validates every message received from the NTA application. If any information in the message has been detectably corrupted, the ATA returns the message to the sender using the Kernel function Report BadMessage(). The ATA also sends the NTA an ATA_RESET_MSG to attempt to recover from the potential loss of information. An error message is also sent to the monitor system message window.

2.6 Database Interface

The ORACLE database is used to retrieve node numbers from the node table whenever an NTA_RESET_MSG is received. The format of the SQL query is: "SELECT NODE.NODENMBR FROM NODE, NET_NODE WHERE NET_NODE.NODEID=-NODE.NODEID".

3. Internal Design Specification

There are two logical components of the alarm table application. The first (resident in the monitors), is the ATA. The second is the ATAPE which resides in each of the IDNX nodes in the monitor network.

The ATA distributes alarms to MAGIC and to the NAM. The ATAPE collects alarm table information from the IDNX event log manager ELM and conveys it to the ATA.

3.1 The ATA Interface to the ATAPE

When the ATA is (re)started, it creates and initiates a session with ATAPE tasks on each of the IDNX nodes defined in the monitor domain, and retrieves their alarm tables. Thereafter, barring session connection errors, the ATAPE sends periodic status messages (idle or alarm changes) to the ATA.

The formats of the messages exchanged between the ATA and the ATAPE are defined in Appendix A.

3.1.1 Session Initialization

Figure 18:
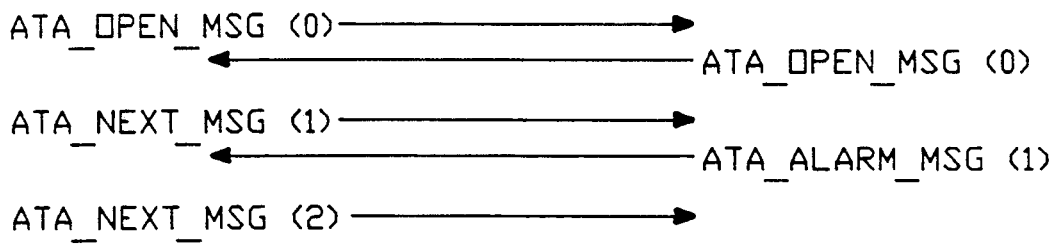
FIG. 18 illustrates the session initialization protocol between the alarm table application on the monitor node and the corresponding application on the distributed switching nodes.

If the ATA creates more than one ATAPE at a time (e.g., multiple new node number conveyed via an NAT_NODES_IN_NET_MSG), then it will stagger opening each ATAPE session by a short cumulative delay. This is the only mechanism employed to stagger the individual ATAPE session activities. A session is opened using the exchange illustrated in FIG. 18.

When the ATAPE receives the ATA_OPEN_MSG message, it copies the ELM alarm log into a local alarm table, and constructs some number of ATA_ALAR- M_MSG messages for the ATA. The messages are sent to the ATA in response to ATA_NEXT_MSG messages, one alarm message at a time. Each alarm message contains as many ELM alarm records as possible (up to MAX_SCLP_MSG_SIZE). The alarm messages will be buffered by the ATAPE until an ATA_NEXT_MSG, acknowledging the receipt of the message, is received by the ATA. Message numbers (modulo 256) are used to acknowledge positively or negatively the ATA-ALARM-MSG from the ATAPE. When a negative acknowledgment is received from the ATA, the ATAPE will retransmit the last ATA_ALARM-MSG.

The last ATA_NEXT_MSG in this session initialization exchange is used as an outstanding request for an alarm table status message. This is described further in the following section.

The ATAPE is responsible for translating the alarm record timestamps from the IDNX's internal time format to the monitor's seconds since epoch SSE format. The IDNX maintains an SSE clock which is initialized indirectly by the monitor NTA application.

3.1.2 Normal Session Procedures

Figure 19:
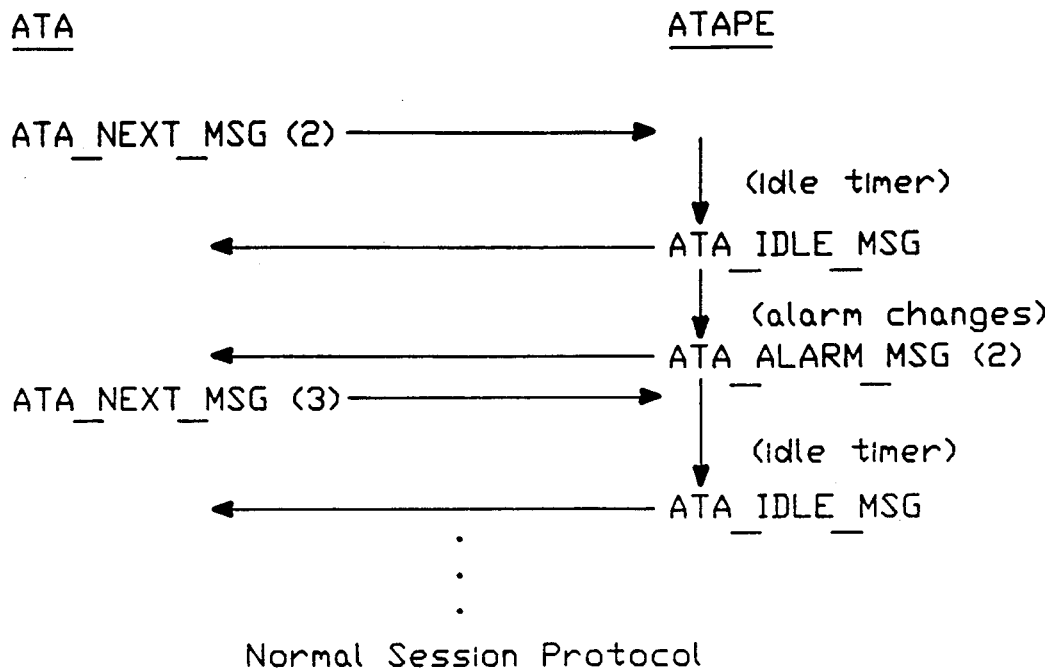
FIG. 19 illustrates the normal session protocol between the alarm table application on the monitor node and the corresponding application on the distributed switching nodes.

The normal session protocol is designed to achieve a balance between minimal network traffic and timely collection of alarms from the IDNX nodes. It is illustrated in FIG. 19.

The normal scenario requires the ATAPE to start an idle timer after an ATA_NEXT_MSG is received and if there are no alarm table changes to send. When the timer expires, and if no alarm table changes have been accumulated, the ATAPE will send an ATA_IDLE_MSG to the ATA. This is an unnumbered message, requiring no response from the ATA. It merely informs the ATA that the ATAPE is still responsive. (The ATA maintains an inactivity timer to recover form the case where communication with the ATAPE has been interrupted. This is discussed in the next section.)

While the ATAPE's idle timer is decrementing, it will continue to check the ELM's alarm log for changes at regular intervals. When changes are detected, they are copied into the APE's local alarm table, and ATA_ALARM_MSG messages are subsequently constructed to convey the changes to the ATA. The ATAPE will fit as many changed alarm records into the ATA_ALARM_MSG as possible (limited by MAX_SCLP_MSG_SIZE). The response from the ATA to an ATA_ALARM_MSG is an ATA_NEXT_MSG with the message sequence count incremented by one.

Once the alarm log has been initially conveyed to the ATA during session initialization, only changes (new, altered, and cleared alarms) to the alarm log are conveyed to the ATA. The ATAPE maintains internal accounting in its alarm table which indicates which alarm records need to be conveyed to the ATA when the next set of ATA-ALARM-MSGs are constructed.

The format of the ATA-ALARM-MSG specifies that active alarm records are sent using the ATAAlarmEntry structure definition. Cleared alarms are sent in compressed form. Since the ATa maintains its own internal copy of the ELM alarm logs as well, this amounts to conveying which alarm log record has been cleared; the contents of the cleared alarm record are not sent.

The synchronization between the ATAPE's interface with the ELM, and its interface with the ATA is sensitive to the fact that there is a real possibility that any given copy of the ELM's alarm log may not be consistent. This is due to the fact that the ELM may be updating the alarm log while the ATAPE is reading it (it takes several exchanges with the ELM to read the entire table). Thus, the ATAPE verifies that alarm summaries have not changed between the time it starts to read the alarm log and the time it finishes reading the alarm log. If the alarm summary information has changed, the ATAPE reads the alarm log again, and continues to do so until the alarm log has stabilized. There is a limit to the number of times that the ATAPE will reread the alarm log, before sending a response to the ATA (to avoid timing out its interface with the ATA, or unnecessarily delaying alarm updates to the ATA). When this limit is reached, the ATAPE will verify that although the alarm log may still be in a state of flux, that it is consistent (e.g., there are no "duplicate" alarm records. Duplicate alarms occur when an alarm record is preempted by a more critical alarm, and then is re-inserted into the table while the ATAPE is reading the alarm log).

3.1.3 Session Error Recovery and Session Termination 3.1.3.1 Lost Message Recovery The ATA is responsible for recovering messages which have been lost due to trunk downs, abnormal network delays, or IDNX task and node failures. For this purpose, the ATA initiates an inactivity timer whenever it sends a message to the ATAPE. This timer has a relatively long expiration period since this type of recovery is considered to be rare. When the timer expires, the ATA re-transmits its last message, and re-starts its inactivity timer. The ATA will attempt to recover three times, before concluding that the session is not recoverable.

If the recovery attempt fails, the ATA will inform the ATAPE to delete itself, re-create the ATAPE task and re-open a session with it. This procedure will be repeated until either the ATAPE responds, or the NTA informs the ATA that the node has gone down or that it has been deleted from the monitor network.

3.1.3.2 Application Resets

When the ATA restarts, it will create and open sessions with the ATAPE tasks. If the ATAPE already exists from a previous incarnation of the ATA, then the ATAPE will reinitialize its session with the ATA, and send a full copy of its alarm table to the ATA.

Figure 20:
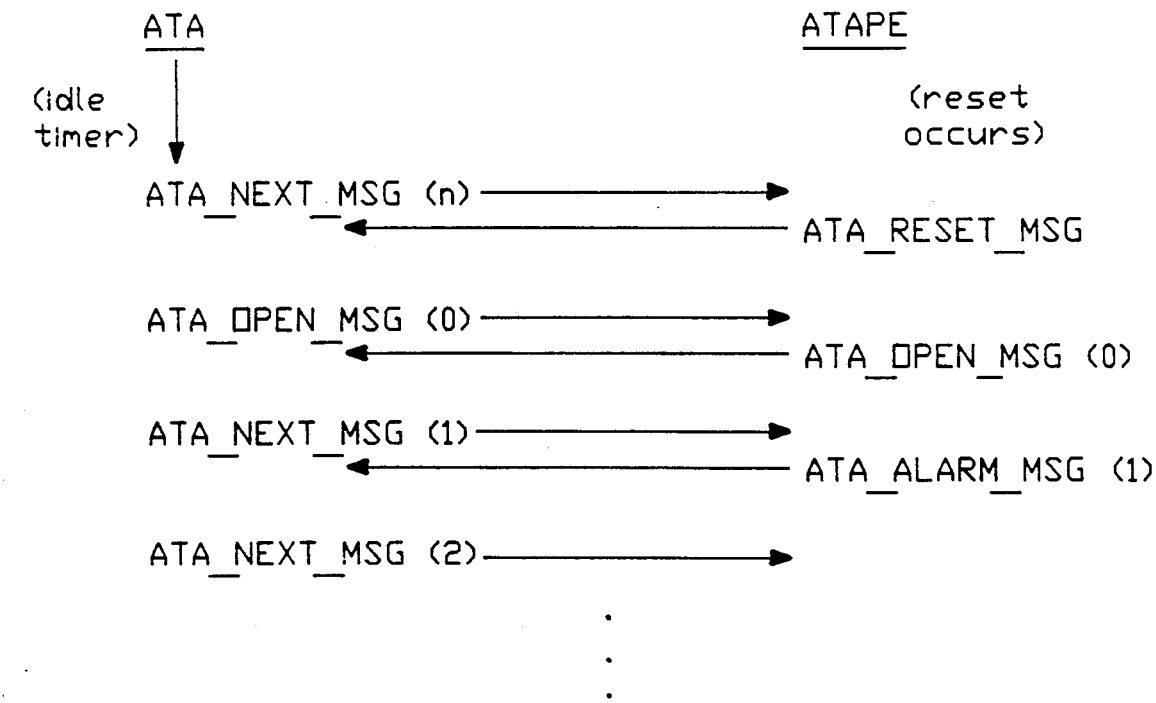
FIG. 20 illustrates a reset protocol between the alarm table application on the monitor node and the corresponding application on the switching node.

If the ATAPE task abnormally ends and is restarted by the OM, then it is possible for the new ATAPE initially to receive a message other than an ATA_OPEN_MSG from the ATA. In this case, the ATAPE will send the ATA an ATA-RESET_MSG. This causes the ATA to reinitialize the session with an ATA OPEN MSG response. When the ATA receives the new alarm from the ATAPE, it will compare the table record by record with its internal (old) copy of the table. Differences will be noted, and appropriately conveyed to the MAGIC and NAM applications. This exchange is illustrated in FIG. 20.

The ATAPE maintains a very long inactivity timer on its interface with the ATA. The timer is long enough to sustain the ATA-ATAPE session over normal trunk outages. The purpose for the timer is that the ATAPE task will delete itself if there is no ATA to talk to after a suitably long interval. This addresses the possibility that the ATA's ATA_DELETE$_{13}$ MSG to the ATAPE is dropped by the network. It also addresses the disconnection of the monitor from the network for a long period of time (e.g., the user logged out of the monitor for the weekend).

The ATAPE also maintains an inactivity timer on its interface to the ELM. If the ELM does not respond to the query for summary information, the query will be resent some number of times. This is done since the ATAPE might request the summary information before the shadow ELM has completed its initialization with the master ELM. If the ELM does not respond while the ATAPE is reading the alarm log, then the ATAPE task will abnormally terminate itself. The ATA will re-start the ATAPE as described in the preceding section.

3.1.3.3 Session Termination

The ATA deletes the ATAPE when it receives an NTA_NODE_DELETED_MSG from the NTA. The ATA sends an ATA_DELETE_MSG to the ATAPE. The ATAPE sends the TASK_DELETE message to the OM on the CPU it is running on, and continues normal session processing. The OM will subsequently preempt and delete the task.

3.2 ATA Program Internals

This section describes the major data structures and methods created in the ATA to perform the functionality described in the preceding sections. The ATA program was written to run above an IDNX-like Kernel layer, as is provided in the monitor environment. All system level services required by the application are obtained through this Kernel layer. There is no static memory imbedded in the program; all data space is obtained via ReqMem() calls to the Kernel layer.

3.2.1. ATA Major Data Structures

The data structures are defined in Appendix B and are referenced in the following description.

The major data structures in the ATA application are the global data area, the node table (NT), the session control table (SCT) and its associated session control block (SCB), and the network alarm table (NAT).

3.2.1.1 Global Data Area

The global data structure is the primary data structure for the application. It contains pointers (directly and indirectly) to all other data managed by the application, except for local routine data variables allocated on the application stack space.

The timer block pointer (ptimers) points to a Kernel level timer maintained for the ATA application. This timer is used to manage the ATAPE session activity. An associated timer variable (SessnTimer) is also defined in the global data area. The kernel timer is started when the application begins, and expires by default at regular intervals for the life of the application. Each time the timer is reset, the time that it will go off is stored in the SessnTimer variable. A description of this timer's usage is deferred until the ATAPE session control block is described.

The other variables in the global data area are for information which the application needs and that are global in scope to the application, such as session timer values, the number of retries which will be performed relative to the ATAPE sessions, the state of the NAM and MAGIC applications, and the node numbers for the monitor and its neighbor node.

The program keeps track of the state of the applications to which it distributes alarms, to avoid errors incurred by trying to send messages to them when they are not active. When the ATA (re)starts, it determines the state of NAM and MAGIC using the Kernel FindTask() service. If the task is up, the startup handshake is performed, and the Boolean (NamUp or MagicUp) is set TRUE. When the return handshake is received, ATA requests the Kernel to notify it should the application terminate, by sending the Kernel a SEND_NOTIFY_MSG. The Kernel returns this message when the application terminates. Before sending alarm information to the MAGIC and NAM applications, the ATA consults their respective state Booleans in the global data area.

3.2.1.2 Node Table

The node table (NT) primarily associates IDNX node numbers with an index into the session control table. This is used to retrieve the appropriate session control block for managing the session with a particular ATAPE task.

3.2.1.3 Session Control Table and Session Control Block

The session control table is a fixed length array of session control blocks. The session control block is the controlling data structure for a particular ATAPE session.

The ATAPE sessions are state-driven and the SCB variable, SessnSts, defines the current state for an ATAPE. When the ATA suspends an ATAPE session because a NODE_DOWN message was received from the NTA, then the current state is backed up in the SCB variable, SessnPendSts, and the SessnSts is set to indicate a suspended session state. The possible session states are:

NULL_SESSN state used during error recovery when an ATAPE task has been deleted, and is to be re-created after a short interval.

DORMANT_SESSN state between creation of an ATAPE task, and session initialization.

OPENING_SESSN state while the ATA is waiting for the ATAPE to respond to the OPEN_MSG.

ACTIVE_SESSN state during which the ATA expects to receive alarm and idle messages from the ATAPE.

SUSPENDED_SESSN state during which the session has been suspended, pending reconnectivity to the ATAPE'S node.

There are a number of variables in the SCB used to control the session such as the node number the ATAPE resides on, the retry counter used for error recovery, and the current session message counter used to detect out-of-sequence messages.

The SCB timer variable is used to drive the various session startup and error recovery activities which the ATA performs while managing the ATAPE sessions. When a particular activity (such as sending the ATA_OPEN_MSG) is scheduled to occur, the ATA sets the SCB timer variable. Then the ATA checks the overall session timer variable in the global data area to determine when the session timer is due to expire. If it is due to expire before the ATAPE timeout value, then nothing is done. If the session timer is due to expire after the ATAPE timeout value, then the ATA resets the session timer to expire at the earlier time. When the global session timer expires, the ATA scans each ATAPE timer value to determine which ATAPE session requires some activity to be performed.

There are three linked lists defined in the SCB for buffering incoming alarm messages from the ATAPE tasks, and outgoing alarm messages to the MAGIC and NAM tasks. The ATA must process an entire snapshot of the alarm table before the alarm information is distributed to MAGIC and to NAM. The risks in not doing so are related to the architecture and algorithms used by the ELM to manage its alarm log. The symptoms which would result from not buffering in this fashion include redundant and erroneous alarm information to both NAM and MAGIC.

The SCB variable, AlarmTblLen, is used to accommodate a variable alarm table size across the IDNX network. Although the alarm log has a fixed size, it is anticipated that the alarm log size will be increased to meet the demands of larger, more complicated networks. When this is done, it will be possible for ATAPE tasks on different machines to be monitoring different size alarm logs. The ATAPE therefore reports the size of the alarm log to the ATA during session initialization, as part of the ATA_OPEN_MSG handshake. This size determines the length of the ATA's copy of the alarm log (NAT - this is discussed subsequently), and the maximum number of alarm messages which the ATA will expect to receive from the ATAPE in a single snapshot of the alarm log (SCB variable MaxAlarmMsgs).

The network alarm table for a given ATAPE is pointed to by the SCB variable pNat. This table is discussed in the next section.

3.2.1.4 Network Alarm Table

The network alarm table (NAT) contains an image of the relevant alarm information maintained in the ELM alarm log. There is one NAT per ATAPE.

Each record in the table contains a state variable used to discriminate active versus inactive alarms, and whether the first image of the ELM's alarm log has been received from the ATAPE, the level of the alarm (inactive alarm, or the criticality of an active alarm), the alarm record in AtaAlarmEntry format, and two pointers used to maintain a series of linked lists of alarm records wound through the NAT structure.

The ATA maintains an image of the alarm log, rather than a list of active alarms, for expediency both during implementation and during execution. Updates to the NAT are accomplished directly using the alarm table index provided in the ATAPE's ATA_ALARM_MSG records.

The linked list pointers in the NAT record are used to link all of the alarms for a given network device together. The first alarm record in any list represents the most critical alarm for that device. Updates to the NAT entail not only revising the alarm information, but also the link list pointers relative to the other alarms in the table for that particular device. The complexity introduced by the lists and the logic required to maintain them, expedite the distribution of alarms to MAGIC. In general, an alarm is reported to MAGIC if it is at the top of the linked list, or if it was previously active and has been cleared.

The ATA must recognize when one active alarm record has been bumped from the alarm table in favor of a more critical alarm. This alarm may or may not be for the same device. In most cases, ATA must interpret this as the deletion (or clearing) of one alarm, and the addition of a new alarm, and appropriately report the results to MAGIC and NAM.

3.3 ATAPE Program Internals

This section describes the major data structures and routines created in the ATAPE to perform the functionality described in the preceding sections.

3.3.1 ATAPE Major Data Structures

The data structures are defined in Appendix C, and will be referenced in the following description.

The major data structures in the ATAPE application are the global data area, the session control block SCB, the ELM control block ECB, and the alarm table AT.

3.3.1.1 Global Data Area

The global data structure is the primary data structure for the ATAPE. It contains pointers directly and indirectly to all other data managed by the application, except for local routine data variables allocated on the task's stack.

The timer block variable, pTimers, points to a block of timers managed by the Kernel for the ATAPE task. The ATAPE keeps four timers:

SessnWatchdog—used as a long timeout on the ATA-ATAPE session. When this expires the ATAPE sends the ATA an alarm message (empty if there are no alarm changes) in order to solicit a response from the ATA. The timer is then reset. If it expires again, the ATAPE deletes itself.

SessnIdle—used to determine when a response must be sent to the ATA to avoid timing out the session interface. Either an idle or an alarm change message is sent when this timer expires.

ElmWatchdog—used to determine a no-response situation with the ELM.

ElmPoll—used to drive the alarm summary queries at a regular rate.

The SCB, ECB, and AT data structures will be discussed subsequently.

The variable AlarmsPending is a flag between the ELM interface logic and the ATA interface logic to indicate that changed alarms are pending for the ATA. The variable, ChngdAlarmCnt, indicated the number of alarms records which have changed.

The semaphore ATLocked, is used by the ELM interface logic to inhibit the sending of changes in the alarm table until a consistent copy has been obtained. When the ATA interface logic detects that alarm changes have occurred (AlarmsPending), it will attempt to send an alarm message. If the ATLocked semaphore is set, an empty alarm message will be constructed.

3.3.1.2 The Session Control Block

The session control block contains all variables necessary to manage the ATA-ATAPE session interface.

The session interface is state-driven. The possible states are:

DORMANT_SESSN state after the ATAPE starts up, and before it receives an ATA_OPEN_MSG from the ATA.

OPENING_SESSN state after the ATAPE receives the ATA_OPEN_MSG, and before it receives the first ATA-NEXT-MSG from the ATA.

IDLING_SESSN state when there are no alarm changes to be sent.

ALARMING_SESSN state when there are either alarm changes to be sent, or the SeenWatchdog timer has expired and a null alarm message has been sent. In either case a response is expected from the ATA.

The other variables in the session control block control the message sequencing and message buffering necessary to achieve the functionality already described.

3.3.1.3 The ELM Control Block

The ELM control block ECB controls the interface to the ELM task. This interface is state-driven and the two states (POLLING_SUMMARIES and READING_ALARMS) define whether the ATAPE is polling summaries (waiting for alarm changes), or reading the alarm table and recording changes in its local alarm table.

The variables, TotalAlarmCnt and ActiveAlarmCnt, reflect the last alarm summary information received from the ELM, and are compared with the next set of summary information in order to detect changes to the alarm table. This subset of the ELM's summary information is sufficient for detecting all new, changed, and cleared alarms in the ELM's alarm log.

The pointer variable, pReqSummMsg, is used to keep track of the message buffer used to read the alarm log. The same message which is sent by the ATAPE, is returned by the ELM, and sent again by the ATAPE until the entire alarm log is written.

The variables, ReqAlarmBlk and RetryCnt, are used for detecting and recovering from errors in the exchanges with the ELM.

The variable, ElmTid, identifies with which ELM (master, or one of several possible shadow ELMs) the ATAPE is communicating.

3.3.1.4 The Alarm Table

The alarm table (AT) contains an image of the relevant alarm information contained in the ELM's alarm log. It also contains a flag in each alarm record indicating whether the alarm record has changed since the last snapshot was taken and queued to the session interface.

VIII. Design of the Monitor Database Application

1. Introduction

The DBA is responsible for maintaining accurate information about IDNX configuration databases, and real-time trunk status in the network. It receives the physical database blocks from the APE (Attached Processor Executor) and translates this information into DBMS (ORACLE) requests, i.e., gives the physical blocks logical meaning.

Figure 21:
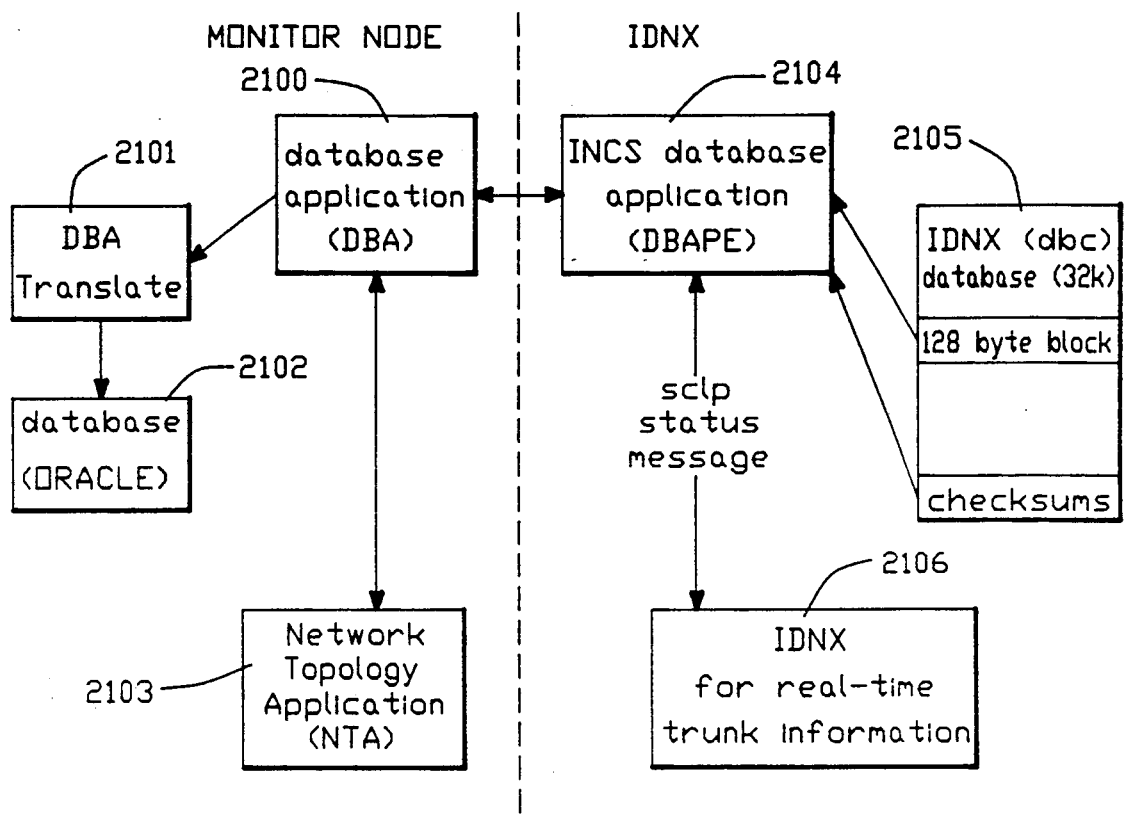
FIG. 21 is a data flow diagram for the database application.

FIG. 21 is a block diagram of the applications and data flow during a database upload from an IDNX node to the monitor node. The monitor node includes the database application DBA 2100, a DBA translate module 2101 and the monitor database based on ORACLE 2102. In addition, the network topology application NTA 2103 is on the monitor node. On each of the IDNX switching nodes distributed in the network, there is a database application attached processor executor DBAPE 2104, the IDNX node database DBC 2105 and an IDNX communications task 2106 generating real-time trunk information.

The IDNX database DBC consists of a plurality of 128-byte blocks and checksums for data contained in the blocks. Operation of the applications running as shown in FIG. 21 is described below.

2. Getting the Data

The DBA must upload databases and accept changes to databases in such a way as to prevent message overruns on the IDNX node to which the monitor is attached. It may deal with the nodes in the network serially or in parallel. The actual protocol and messages are described below. The protocol allows for an efficient use of bandwidth and of IDNX resources.

The DBA must be notified by the Network Topology Application (NTA) when nodes which are to be monitored are cut off from the monitor and again when they are reachable. This includes failure of the link between the monitor and the IDNX, the DBA must be informed first of the failure and then when the link comes up again.

The DBA must maintain continuity even across DBA crashes, monitor crashes, and even IDNX node crashes.

3. Translating the Data

Translation from physical database to DBMS format is a two-step process, first from physical blocks to logical entities, and second from the logical entities to DBMS table entries. To translate the data, the DBA must keep a copy of a node's physical database at all times as a reference to detect changes.

The key here is to be able to limit the effort in translation when only a few blocks change. The translation process at step two is where this can be accomplished.

The actual translation process uses the IDNX structures to define the physical layout of the database. The incoming data blocks from the node are compared with the copy of the database kept locally and the location of the changed bytes is mapped to the IDNX structures. This reveals which logical changes have been made and special code to handle each type of logical change is called to make the translation to DBMS SQL data. Since certain values in some logical record fields have different meanings depending on other fields (e.g., the status field of a card record depends on the card type field) the physical to logical mapping is non trivial, but would be well understood by one skilled in the art.

4. Interface with Other Monitor Tasks The Network Topology Application (NTA) is responsible for notifying the DBA of node up and node down events. When the DBA receives a node up event, it either creates a DBAPE on the target node and gets the initial copy of the database for the node, or it checks with the DBAPE for any changes to the node's database. If changes are detected, the DBA sends a message to the NTA indicating that the node database has changed and that an upload will be made. After uploading the database, if necessary the DBA sends a message to the NTA indicating that the initialization is complete. Functionally this means that the DBMS database on the monitor has been completely updated and is in a valid state for that node. Only then does the NTA notify the other monitor tasks that the node is "up".

When a change to a node database is recorded by the DBA, it must send a message to MAGIC (the graphics interface to the user) indicating the changed data in order to keep the user interface current. As the DBA makes changes to the DBMS, it keeps track of the changes, and when finished notifies MAGIC with MAGIC's defined messages for adding, deleting, and modifying objects.

5. DBA Data Structures

Figure 22:
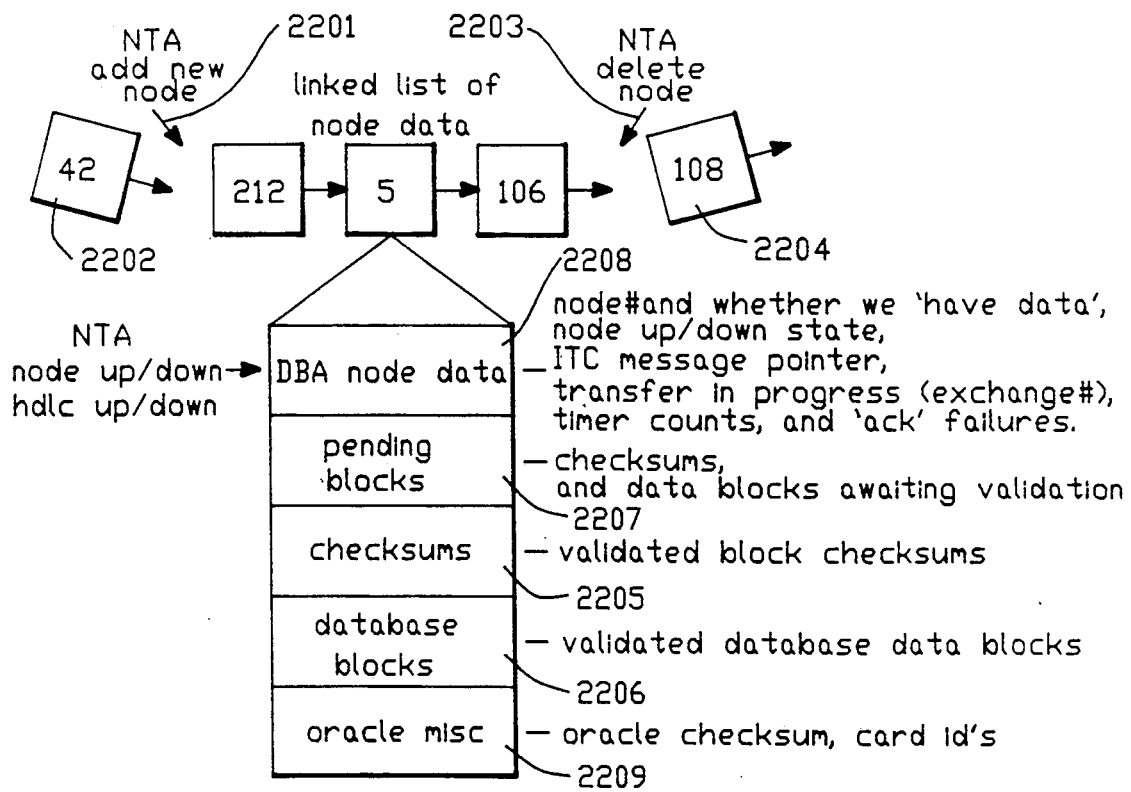
FIG. 22 illustrates the data structures on the monitor node for the database application.

The DBA keeps track of the node data in a linked list of node structures illustrated schematically in FIG. 22. When a message from NTA arrives to add a new node 2201, a new data structure 2202 is allocated and added to the list. If later NTA sends a delete node message 2203, its data 2204 is deleted from the list and deallocated. The number of nodes the application can handle is therefore limited only by the amount of memory available, there are no hardwired limits. The node structure is made up of checksums 2205, database blocks 2206, pending blocks 2207, and miscellaneous DBA 2208 and ORACLE data 2209. The database blocks consist of all the database blocks in the node database as well as the real-time data (in block format). The checksums are the checksums for each of these blocks. The pending blocks area consists of a list of block numbers, block data, and checksums for blocks that have been received but not verified yet. To be verified, the next group of blocks or an 'all ok' message must arrive from the APE. Once blocks are verified, they are transferred to the database block area and the checksums are updated. The miscellaneous area for ORACLE is used to hold an ORACLE checksum and table indexes (for efficiency). The miscellaneous area for DBA holds the node number, the node up/down state, a pointer to the last ITC message sent, timer counts and 'ack' failures.

Once the APE has finished uploading data, it sends an "all ok" message. This triggers the DBA to begin translating (block 2101) the data to the DBMS. When this translation is complete and the DBMS 2102 has been updated successfully, the node data is saved to disk as the last known stable state of the node. Thus, incoming changes are made in RAM, and when complete, the RAM image of the node is compared with the disk image (which reflects the information in the DBMS) to find the differences for translation. The disk image is also used to recover from system crashes. The ORACLE checksum is used to protect against the DBMS changing (from a crash or a re-initialization) while the disk file does not. If this happens, the ORACLE checksum kept in the disk file will not match the checksum kept in ORACLE, and a complete reload of the DBMS from local data is triggered.

6. The Database Ape

The database APE (DBAPE) is the monitor database application surrogate in the IDNX world. It runs on the same CPU as the IDNX DBC task which is responsible for the IDNX database. The CPU is the coprocessor CPU if one is available, but may be the master CPU if none other exists, thus the DBAPE runs in a "CO-PROCESSOR PREFERRED" mode.

Figure 23:
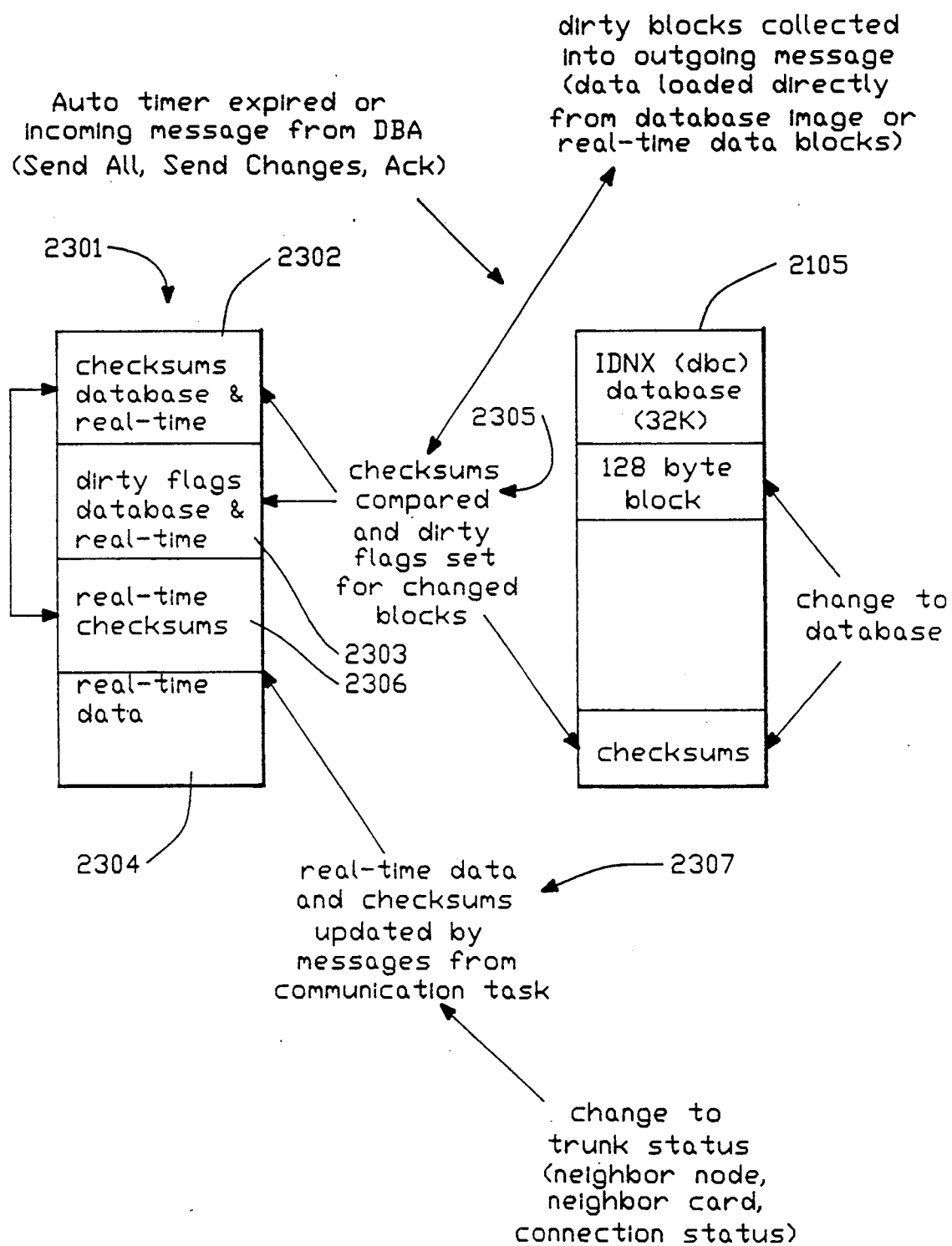
FIG. 23 illustrates data structures on the distributed switching nodes for the database application.

The APE has three major data structures illustrated in FIG. 23 at block 2301. One is the set of all the most recently acknowledged checksums 2302, that it has sent to the monitor DBA. The next is a list of the blocks (dirty flags 2303) needing to be uploaded to the monitor DBA. The last is a set of real-time data 2304 received from the trunk tasks 2307 as a result of trunk status changes. This real-time data is packaged into database sized blocks, checksums 306 are calculated, and thereafter the blocks are treated as "extra" physical database blocks.

7. Database Initialization and Reinitialization

When the APE starts up, the set of all real-time information is initialized and the list of blocks to be uploaded (the "dirty" blocks) is cleared. The APE then waits, gathering any real-time data, until a message is received from the monitor DBA.

The APE reads the DBC data blocks and checksums directly from memory, with no formal interaction with the DBC itself, and the real-time data blocks are read from its own internal data structures. When a request for initialization arrives, the data blocks are all marked for upload, and then packaged and sent to the DBA. When a request for changes arrives, the DBA checksums are compared to the DBC checksums (and real-time checksums), the data blocks whose checksums differ are marked for upload, and then all blocks marked for upload (whether from this session or an unfinished previous one) are packaged and sent to the DBA.

8. Database Changes

When changes occur to the IDNX database, or the real-time information, the APE can initiate a change message to the DBA. Every 20 seconds, the APE compares checksums and marks any changed blocks as "dirty" (lines 2305). Real-time information changes are sent directly to the APE by the IDNX communications tasks 2307. If any changes are found, the blocks can be sent to the DBA. This can only happen, however, when there are no outstanding message transfers in progress, to prevent flooding the network with messages. Only one outstanding message is allowed at a time. If no response is received, no further messages may be sent until contact with the DBA is reestablished.

9. Messages And Protocols

The messages and protocols are designed to minimize the message traffic over the network and the time and resources used in the IDNX.

There are three messages from the DBA to the DBAPE. Each one (possibly) triggers a flow of data packets from the APE. In the case of changes to the IDNX database this transfer can be initiated by the APE, but always with an ACKing protocol that will prevent a flood of messages to the DBA. There are three messages from the DBAPE back to the DBA. All messages start with an ITC header.

The packet formats below allow for more than 255 128 byte blocks per database. The block numbers are contained in a 'short' rather than a 'char'.

APE interface:

Three types of messages are sent from the APE to the Application—something has changed, nothing has changed (no more changes), and DBC has failed (for info only).

The 'changes' message is sent either in response to a query from the application or initiated by the APE when changes are detected in the IDNX database. It includes the message exchange number (0 if the APE initiates), the total number of blocks that have changed, the number of blocks in this message, the block numbers, their checksums, and their data.

DBA_Changes_Msg struct ItcHeader Hdr
unsigned char exchangenum
unsigned short CurNumChangedBlks
unsigned char NumBlocks
unsigned short BlockListTbl
[MAX_DB_BLOCKS_PER_MSG]
unsigned short BlockCsumTbl
[MAX_DB_BLOCKS_PER_MSG]
unsigned char DP_Data[MAX_DB_BLOCKS_PER_MSG]
[DB_BLKSIZE]

The 'no changes' message is sent in response to a query from the application only if there are no changes in the database, or as the last message after sending changes to indicate that there are no further changes and the data is consistent. It includes the message exchange number and the current global database checksum DBA_No_Changes_Msg struct ItcHeader Hdr
unsigned char exchangenum
int CurDBGlobCsum The 'DBC failed' message is sent in response to a query or by the APE if a DBC failure is detected. It includes only the message exchange number.

DBA_DBC_Failed_Msg struct ItcHeader Hdr
unsigned char exchangenum
DBA interface:

Three types of messages are sent from the Application to the APE—an acknowledgement of a data packet received, a request to upload the whole IDNX database, and a request for changes to the database.

The 'ack' message is sent in response to a data packet ('changes' message) from the APE. It includes the message exchange number the application will expect, and the number of blocks, the block numbers, and the block checksums of the APE message it is acknowledging.

DBA_Ack_DB_Ape_Msg struct ItcHeader Hdr
unsigned char exchangenum
unsigned char NumBlocks
unsigned short BlockListTbl
  [MAX_DB_BLOCKS_PER_MSG]
unsigned short BlockCsumTbl
  [MAX_DB_BLOCKS_PER_MSG]

The 'send all' message is sent to the when the application doesn't have a copy of the IDNX database ('havedata' is FALSE). This requests the APE to upload all of the database blocks. It only includes the message exchange number the application will expect.

DBA_Send_All_Msg struct ItcHeader Hdr
unsigned char exchangenum

The 'send changes' message is sent to the APE when the application has a copy of the IDNX database ('havedata' is TRUE), and wants to update any changes. The APE is requested to upload only blocks which have changed. It includes the message exchange number the application will expect, the global database checksum and the application's block checksum values.

DBA_Send Changes Msg struct ItcHeader Hdr
unsigned char exchangenum
int CurDBGlobCsum
unsigned short BlockCsumTbl[DB_NUMBLKS]

NTA Interface:

Three types of messages are sent from the Application to the NTA—a reset message when the application has reset and needs to know which nodes are in the network, a database valid message when the APE has finished uploading and translating data for a node, and a database changed (changing) message when the APE detects that a node's database has changed and needs to be uploaded.

The 'nta' message is used for all NTA messages. It consists only of a 'data' field which holds the IDNX node number for a 'valid' or 'changed' message. This field is undefined for the 'reset' message.

define DBA_NTA_DBA_RESET_MSG
  (DBA_INCS_MSGS_BEGIN+0)
define DBA_NTA_DB_VALID+MSG
  (DBA_INCS_MSGS_BEGIN+1)
define DBA_NTA_DB_CHANGED_MSG
  (DBA_INCS_MSGS_BEGIN+2)

DBA_NTA_Msg struct ItcHeader Hdr
short data

These messages are expected from the NTA:
The NTA_ALL_NODE_UP_MSG alerts dba that a specific node is up and is reachable.
The NTA_NODE_DOWN_MSG alerts dba that a specific node has gone down or is unreachable.
The NTA_NODE_DELETED_MSG alerts the dba that a specific node has been deleted from the monitor domain.
The NTA_HDLC_LINK_DOWN alerts the dba that the HDLC link has gone down.
The NTA_ALL_LINK_UP_MSG alerts the DBA that the HDLC link is up.
The NTA_ALL_NODES_IN_NET_MSG gives information about all nodes that are up in the monitor domain.
The NTA_RESET_MSG alerts the dba that NTA has reset.

10. Message Protocols

Since the message passing between the DBA and its APE occurs at the datagram level, extra protocols must be used to ensure that messages arrive in order or even that messages arrive at all. The DBA - DBAPE protocol addresses the message delivery problem by requiring messages to be 'ack'ed either by a specific 'ack' message from the DBA, or by a response from the DBAPE. Another problem is that messages can be delayed in the network. An earlier message can arrive after one sent later, possibly bringing stale, or out of date news.

To make sure the database always reflects the correct and current state of the node, the message passing protocol used between the DBA and its APE uses a signature byte (the exchangenum) to ensure that old messages are discarded. The exchangenum is an unsigned byte quantity which wraps from 1 to 255 and back to 1 again (skipping zero). The special value, zero, is reserved for unsolicited messages from the APE. The exchangenum is incremented when this message is received and otherwise only when an error in a message exchange is encountered.

Figure 24:
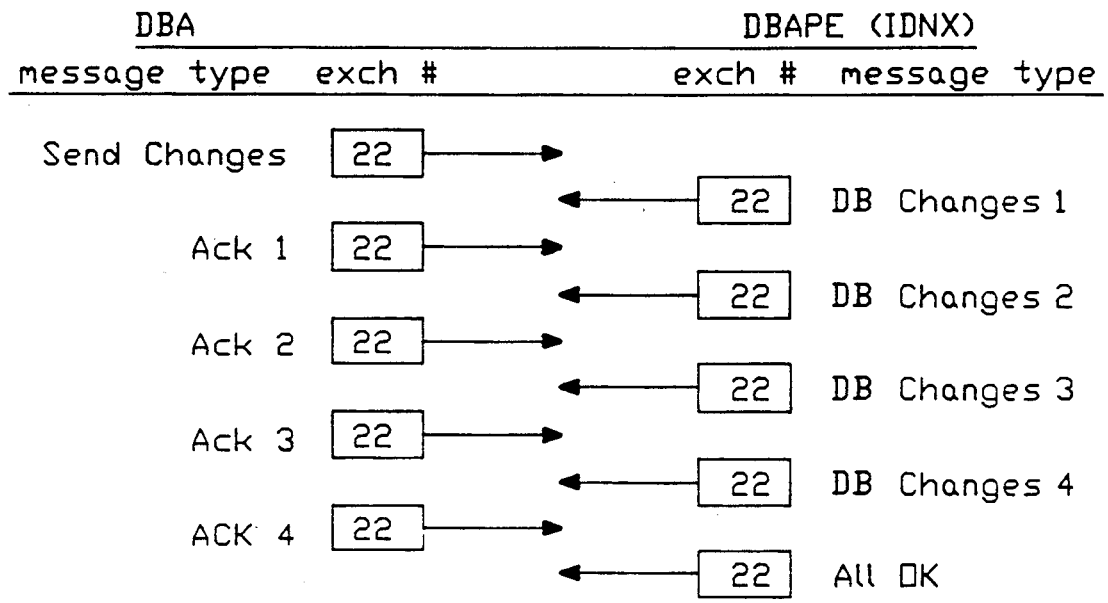
FIGS. 24 and 25 illustrate the message-exchange protocol for normal operation between the DBA running on the monitor node and the DBAPE running on the switching nodes.
Figure 25:
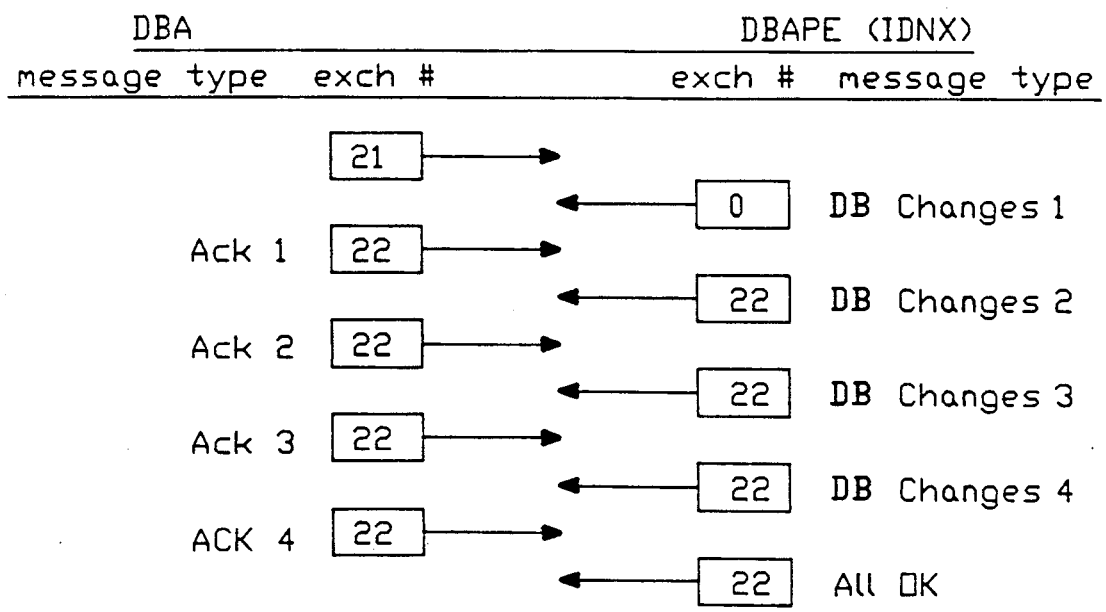
Figure 26:
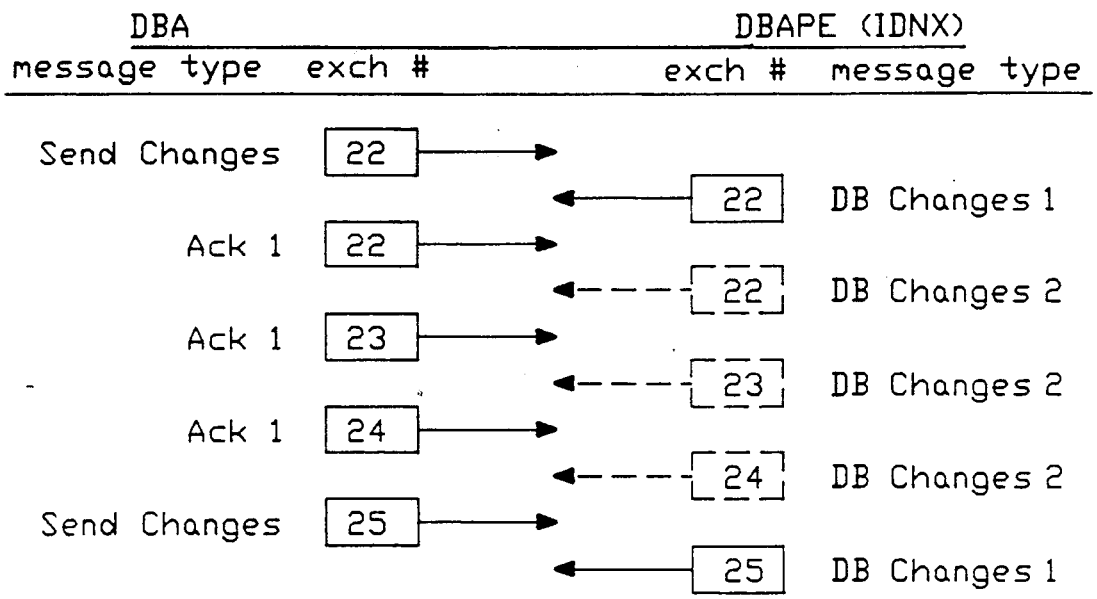
FIGS. 26 and 27 illustrate the message-exchange protocol for lost messages between the DBA running on the monitor node and the DBAPE running on the switching nodes.
Figure 27:
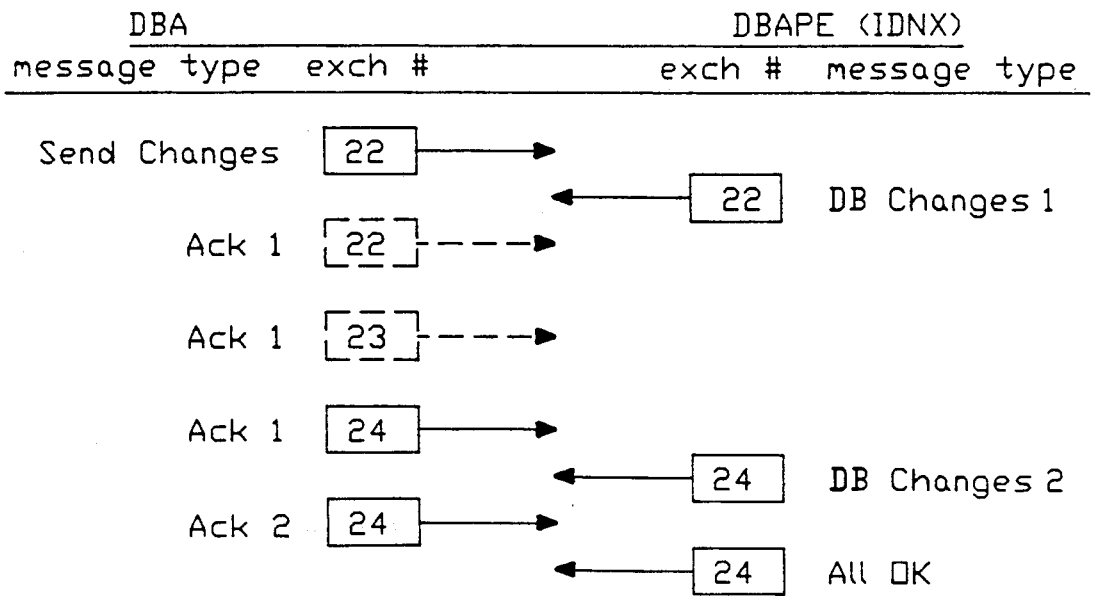
Figure 28:
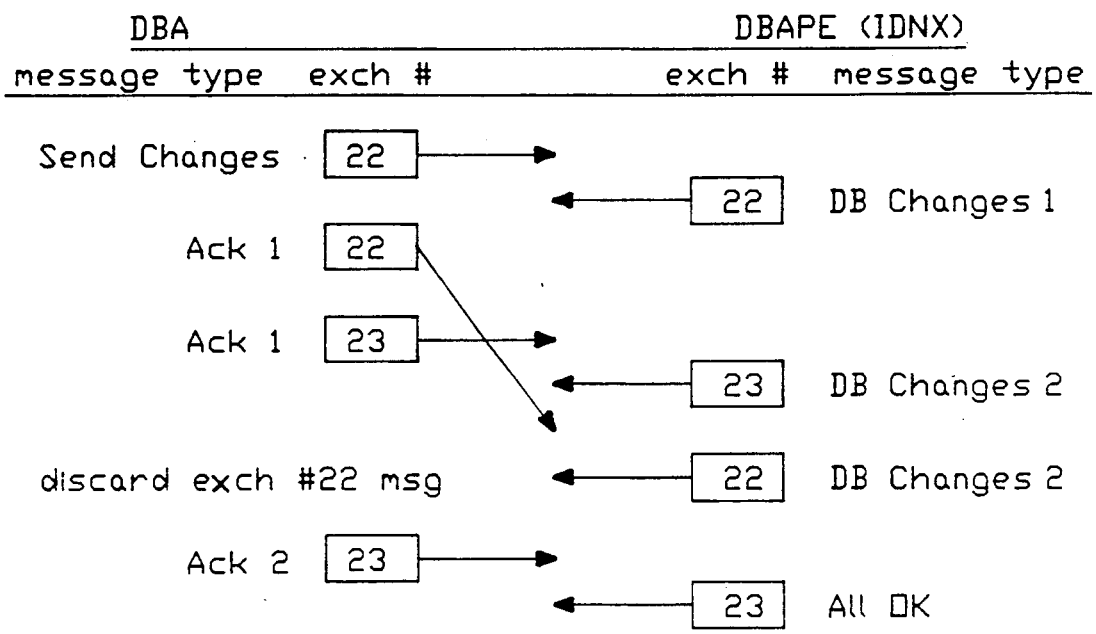
FIGS. 28 and 29 illustrate the message-exchange protocol for messages out-of-sync between the DBA running on the monitor node and the DBAPE running on the switching nodes.
Figure 29:
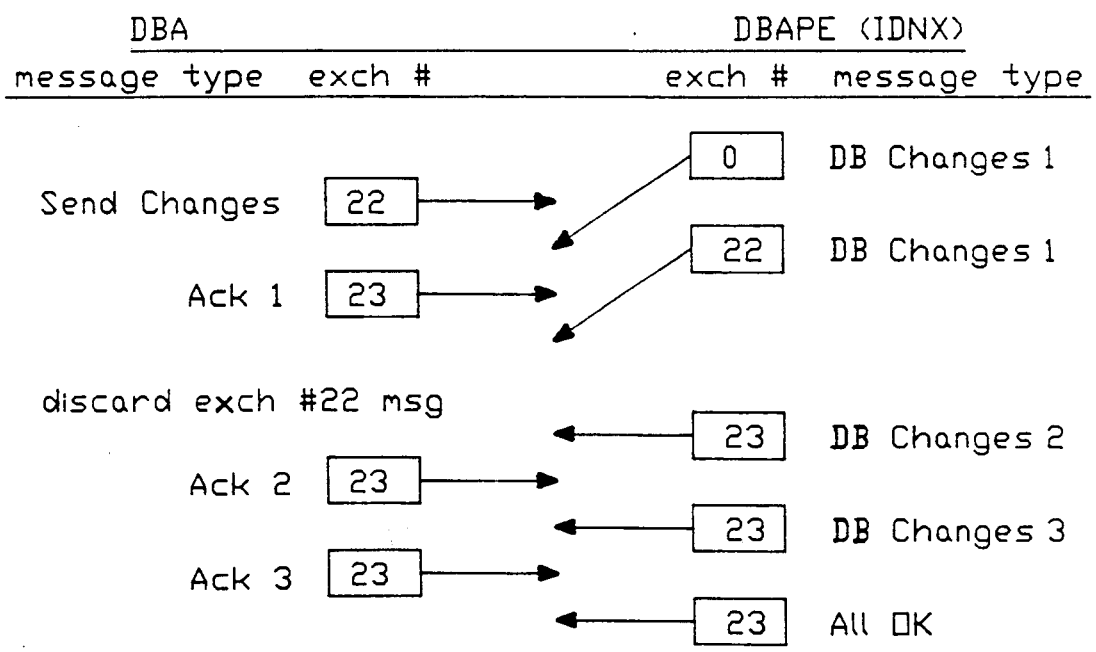
Figure 30:
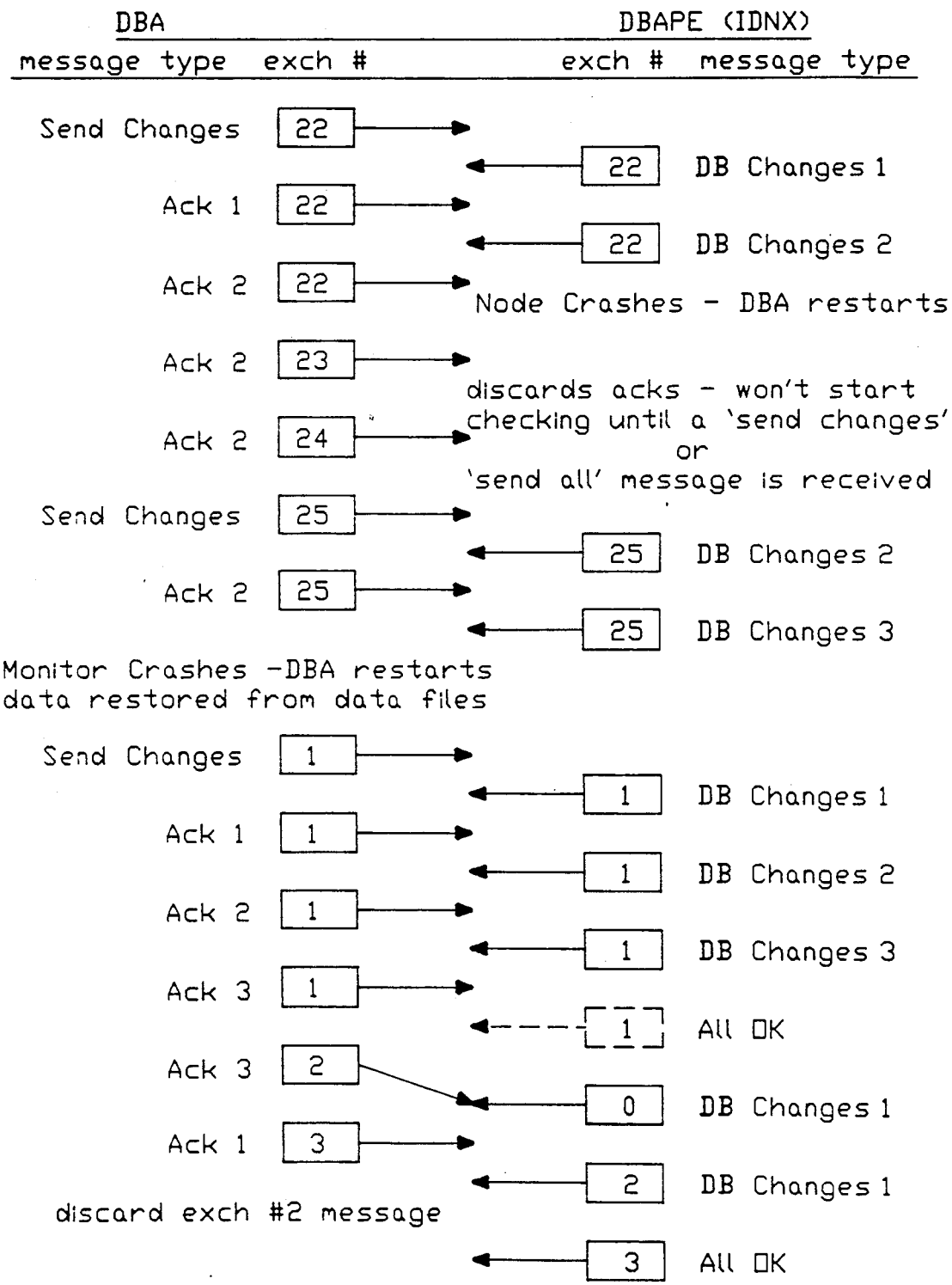
FIG. 30 illustrates the message-exchange protocol for pathological failure between the DBA running on the monitor node and the DBAPE running on the switching nodes.

As illustrated in FIG. 24, the DBA keeps track of the exchangenum it expects to receive. The APE only echoes what it is sent. This simplifies synchronization in case the APE or the DBA crashes. This is why, if the APE initiates the message, it sets the exchangenum to zero (FIG. 25), since it does not know the exchangenum to use.

For example, if messages are being transferred and the current exchangenum is 22, and an 'ack' message from the DBA to the APE is delayed in the network, the DBA could time out and resend the 'ack'. In this case the exchangenum for the new 'ack' is incremented to 23. If both messages are received by the APE, a reply is sent for each. Only the reply with the exchangenum of 23 will be accepted by the DBA, the one with 22 will be discarded (see FIGS. 26–30).

11. Protocol

During normal operation, the DBA sends a 'send changes' message to the APE with a complete list of checksums. The APE compares the checksums to the DBC checksums and the real-time checksums, and begins uploading the changed blocks. Each upload message contains up to six database blocks, their numbers, and their checksums. Upon receipt of the changes, the DBA 'ack's the message by returning the blocknumbers and checksums it received. The data is held in the pending area. The APE gets the 'ack' and uses the checksums in the ack message to update its checksum area. This ensures that its idea of the known checksums and that known to the DBA are the same. Receiving the 'ack' frees the APE to send the next batch of changed blocks. When this next message is received by the DBA, the blocks being held in the pending area are considered valid and are loaded into the main database block area. The new blocks take their place in the pending area, and are 'ack'ed as before. This continues until an 'all ok' message is received from the APE. The pending data is loaded into the main area, and the translation routines are called. The current numbers for a complete upload of a node are: 252 database and real-time blocks at 6 blocks per message, or 42 messages.

When communication is difficult (lots of lost or delayed packets), the DBA will keep trying to send messages to the node, as long as the NTA still shows the node as up. Every three retries it will attempt to restart the APE. The APE will kill itself if contact with the monitor is lost for more than forty minutes.

12. Scenarios

During normal operation, there can be several pathological conditions. This section describes how the protocol handles these situations.

12.1 The Monitor crashes or the DBA crashes

The DBA saves the node data to disk after each successful upload. After a crash, the data is restored from disk to the last known stable configuration. Then the DBA sends 'send changes' messages to all reachable APEs and only changed blocks are uploaded. If the NTA notifies the DBA of any newly configured nodes, the DBA sends 'send all' messages to these nodes to upload their entire database. The DBA does not attempt to reach nodes that are currently down.

12.2 The Link State or Node State Changes

In this case the NTA notifies the DBA of link down then up and/or node down then up states. The DBA marks the node or nodes as down and does not attempt to reach these nodes. When an up state is received from the NTA, the DBA sends appropriate 'send changes' messages to all the nodes or the node in question.

12.3 The IDNX Node Crashes or the DBAPE Crashes

This is a virtually transparent event to the monitor. If the node or the APE crashes, no loss of data occurs, and the worst problem is only that the APE will not initiate any change messages until the DBA times out requests them.

12.4 The DBC Crashes

Since the APE does not rely directly on the DBC, this is a transparent event to the monitor.

IX. Network Topology Application Design

1. Introduction

The network topology application NTA is a task running on the monitor which is responsible for maintaining information about the topology of the node network. The NTA communicates with the network manager task on the local node to retrieve the topology map data. No special interface (APE) on the node is required. When changes in the topology occur, the NTA updates its internal topology map and notifies other tasks of the changes.

2. Topology Information Retrieval

The NetMgr tasks in each node maintains a map of the network topology. This map is an array of MAX-NODES by MAXLINKS (250 * 32). For every node number, each row contains the list of neighbor nodes, terminated with a null. A node with no neighbors is not in the network, i.e., DOWN. Associated with the link to each node is a link cost and link attributes (SATELLITE vs. TERRESTRIAL, etc.).

Associated with each row of the topology map is a version number (RowVersion) which is incremented each time that row is changed. A checksum of all of the version numbers (Total Checksum) is maintained to indicate the current configuration of the topology map.

On the monitor, the NTA maintains its own version of the current topology map. At NTA task startup, the map is initialized to all null rows with RowVersion's of 0 (NO_PATH_EXISTS). Periodically (say every 30 seconds), the NTA polls the node NetMgr or its neighbor node to see if the Total Checksum has changed. If so (and at NTA startup), the NTA then queries the NetMgr for its RowVersions and for each one that has changed, the NTA queries changed rows and updates its topology map.

The NTA must detect when the link between the monitor and the local node goes down (ex., an error return when attempting to poll the node, or a message from the network interface task). When this happens, NTA re-initializes its current map (all nodes DOWN) and sends updates to other tasks (described later).

2.1 Node Software Requirements

The NetMgr will need to handle message types to query the TotalChecksum, RowVersions, and RowData.

3. Communication with Other Applications

When a new node comes up in the network, the NTA first checks in the monitor database to see if the node is in this monitor's domain. If not, then NTA does not inform any other task. If the node has been configured, a further check is made to determine if the software version running on the new node is compatible with the monitor. If so, the NTA then informs the database application DBA with a "Node UP" message (NTA-NODE-UP-MSG). When the DBA has a current copy of the node's database, it sends a message to NTA. Then the NTA sends "Node UP" messages to the event application EVA, alarm table application ATA, and MAGIC.

When they start up (or receive a RESET message from the NTA), the EVA, DBA, ATA and MAGIC should assume all nodes are down and then request the complete set of nodes which are UP by sending a RESET message to the NTA. When the NTA restarts, it must send a RESET message to the other tasks to notify them to request the complete set.

When a node goes down, the NTA sends "Node DOWN" messages (NTA-NODE-DOWN-MSG) to each of the other applications.

4. Configuration Tool Interaction

When a node is added or deleted from the monitor domain by the configuration tool, it updates the domain database and then sends a message to NTA. This causes NTA to re-read the database to determine which nodes were added or deleted from the domain.

If a node is added, NTA checks its topology map to determine if the node is currently in the network and has a compatible software version. If so, it then follows the same procedure as for a "Node UP" change in topology. If not, nothing else is done.

If a node is deleted, NTA checks its topology map to determine if the node is currently in the network and has a compatible software version. If so, NTA sends "Node DELETED" messages (NTA-NODE-DELETED-MSG) to the other application tasks. (This may be treated the same as "Node Down" by some tasks.) If not, nothing else is done.

5. Monitor Database Update

The NTA maintains an internal topology map for its own use (ex. to determine what has changed in the network). It does not create or update tables in the monitor database. If other applications develop a need to know about the full topology map, then a message can be defined to transfer that information.

X. Conclusion

The foregoing description of the preferred embodiments of the present invention have been presented for purposes of illustration and description. It is not intended to be exhaustive or to limit the invention to the precise form disclosed. Obviously, many modifications and variations will be apparent to practitioners skilled in this art. The embodiments were chosen and described to explain best the principles of the invention and its practical application, thereby enabling others skilled in the art to understand the invention for various embodiments and with various modifications as are suited to the particular use contemplated. It is intended that the scope of the invention be defined by the following claims and their equivalents.

APPENDIX A

Formats of Messages between the ATA and the ATAPE

37 C.F.R. §1.96(a)(2)(ii)

```
/**********************************************************************/
/*                                                                    */
/*      AtaResetMsg                                                   */
/*                                                                    */
/*      This message is used by the ATAPE to notify the ATA that it reset. */
/*              The ATA will then proceed to re-open the APE session. */
/*                                                                    */
/*      This message is also used by the ATA to solicit the list of active */
/*              IDNX nodes in the INCS domain from the NTA.           */
/*                                                                    */
/**********************************************************************/
struct AtaResetMsg {
        struct ItcHeader        Hdr;            /* Standard ITC msg header. */
        short                   Spare;          /* Not used.                */
};

/**********************************************************************/
/*                                                                    */
/*      AtaDeleteMsg                                                  */
/*                                                                    */
/*      This message is used by the ATA to tell the ATAPE to delete itself. */
/*                                                                    */
/**********************************************************************/
struct AtaDeleteMsg {
        struct ItcHeader        Hdr;            /* Standard ITC msg header. */
        short                   Spare;          /* Not used.                */
};

/**********************************************************************/
/*                                                                    */
/*      AtaOpenMsg                                                    */
/*                                                                    */
/*      This message is used to open a session between the ATA and an APE. */
/*              The ATA initiates the session by sending the OPEN, and the */
/*              the APE confirms the open session by returning the message. */
/*              The ATA will always zero the MsgSeqNo in the Open message. */
/*                                                                    */
/**********************************************************************/
struct AtaOpenMsg {
        struct ItcHeader        Hdr;            /* Standard ITC msg header. */
        unsigned char           MsgSeqNum;      /* Message # next expected. */
        unsigned short          MaxAlarmBlock;  /* Max ELM Alarm Log index. */
```

```
/****************************************************************************/
/*                                                                          */
/*      AtaNextMsg                                                          */
/*                                                                          */
/*      This message is used to solicit the next message from the ATAPE.    */
/*              The response is expected to be either an un-numbered IDLE   */
/*              message or a numbered ALARM message.                        */
/*                                                                          */
/*              MsgSeqNo is the sequence number expected in the next ALARM  */
/*              message sent by the ATAPE.                                  */
/*                                                                          */
/****************************************************************************/
struct AtaNextMsg {
        struct ItcHeader    Hdr;            /* Standard ITC msg header. */
        unsigned char       MsgSeqNum;      /* Sequence # next expected. */

/****************************************************************************/
/*                                                                          */
/*      AtaIdleMsg                                                          */
/*                                                                          */
/*      This message is used to notify the ATA that the ATAPE is alive; it  */
/*              is an un-numbered message. The APE sends this message       */
/*              periodically when there are no alarm changes to send, to    */
/*              keep the ATA from timing the session out.                   */
/*                                                                          */
/****************************************************************************/
struct AtaIdleMsg {
        struct ItcHeader    Hdr;            /* Standard ITC msg header. */
};

/****************************************************************************/
/*                                                                          */
/*      AtaAlarmMsg                                                         */
/*                                                                          */
/*      This message is sent by the ATAPE, in response to a NEXT message,   */
/*              when there are changes to the Alarm Table to report.        */
/*                                                                          */
/*      Message format:                                                     */
/*                                                                          */
/*      +------------+----------+----------+----------+-----+------------+  */
/*      ! ITC header ! MsgSeqNo ! NoAlarms ! Record #1 ! ... ! Record #2 !  */
/*      +------------+----------+----------+----------+-----+------------+  */
/*      ! <16 bytes> ! <1 byte> ! <1 byte> !                              !  */
/*                                                                          */
/*      MsgSeqNo        Sequence number expected next by the ATA.           */
/*      NoAlarms        The Number of alarm records in this message.        */
/*      Record n        The alarm records which follow will have one of     */
/*                              the following formats:                      */
/*                                                                          */
/*      Record Format #1: for reset alarms.                                 */
/*                                                                          */
/*      !----------+----------!                                             */
/*      ! RecIndex ! Flag     !                                             */
/*      +----------+----------!                                             */
/*      ! <1 byte> ! <1 byte> !                                             */
/*                                                                          */
/*      Record Format #2: for new or modified active alarms:                */
/*                                                                          */
/*      !----------+----------+-----------+----------+------------+         */
/*      ! RecIndex ! Flag     !AlarmFlag  ! AlarmCnt ! EventType  !         */
/*      +----------+----------+-----------+----------+------------+         */
/*      ! <1 byte> ! <1 byte> ! <1 byte>  ! <1 byte> ! <2 bytes>  !         */
/*                                                                          */
/*                              +----------+----------+----------!          */
/*                              ! DeviceId ! OrigTOD  ! LastTOD   !          */
/*                              +----------+----------+----------+          */
/*                              ! <4 bytes>! <4 bytes>! <4 bytes> !          */
/*                                                                          */
```

```
/*      RecIndex        The index of this alarm record in the Alarm Table.    */
/*      Flag            Active | Inactive status.                             */
/*      AlarmFlag       Alarm level, Inactive, Network Significance, ..       */
/*      AlarmCnt        Count of alarm occurrences.                           */
/*      EventType       Event Type and SubType.                               */
/*      DeviceID        IDNX Device ID of alarming component.                 */
/*      OrigTOD         Time that the alarm was first triggered.              */
/*      LastTOD         Time that the alarm was last triggered.               */
/*                                                                            */
/****************************************************************************/

/* This Alarm Entry format was copied from IDNX Rel 7.5 code. In Rel 7.7     */
/*      the format was revised, and the coupling between the INCS message,   */
/*      and the IDNX message formats was broken!                             */
struct AtaAlarmEntry {
        unsigned char     Flag;          /* Alarm Flags, Criticality, etc    */
        unsigned char     Count;         /* # of times alarm was triggered.  */
        struct EventType  Event;         /* Event Type of alarm.             */
        struct ElmNetAddr Device;        /* Device that triggered alarm.     */
        unsigned int      OrigEvent;     /* Event that originally triggered  */
        unsigned int      LastEvent;
};

struct AtaNullAlarmRec {                 /* Alarm record SHORT form:         */
        unsigned char     Index;         /* Alarm Table record index.        */
        unsigned char     Flag;          /* APE alarm flag.                  */ define    ALARM_ACTIVE    1             /*       - Active alarm.            */
define    ALARM_INACTIVE  2             /*       - Inactive alarm.          */
};

struct AtaAlarmRec {                     /* Alarm record LONG form:          */
        unsigned char     Index;         /* Alarm Table record index.        */
        unsigned char     Flag;          /* Alarm status:                    */
        struct AtaAlarmEntry Alarm;      /* ELM Alarm record.                */
};

struct AtaAlarmMsg {
        struct ItcHeader  Hdr;           /* Standard ITC msg header.         */
        unsigned char     MsgSeqNum;     /* Sequence number of this msg.     */
        unsigned char     NoAlarms;      /* Number of records in message.    */
        unsigned char     LastAlarm;     /* Boolean => last msg in ATbl set. */
        unsigned char     spare[3];      /*                                  */
        struct AtaAlarmRec Record[1];    /* Alarm records.                   */
```

APPENDIX B

Major Data Structures in ATA

37 C.F.R. §1.96(a)(2)(ii)

```c
/******************************************************************/
/*                                                                */
/* Global storage layout:                                         */
/*                                                                */
/*    GlobalP is the global pointer to the data area. This will be */
/*    registered with the Kernel so that it will be available globally */
/*    throughout the program as an extern. Otherwise, it would have to */
/*    be passed between routines, in order to comply with the IDNX */
/*    limitation on program data storage.                         */
/*                                                                */
/*    gP is defined to be equivalent to GlobalP, as a shorthand reference. */
/*                                                                */
/*    The initialization vars were created for the flexibility of */
/*    modifying critical constants easily during debug, and in the field */
/*    without a re-compile.                                       */
/*                                                                */
/*    "MagicUp" and "NamUp" register the program's idea of the status of */
/*    the application's alarm distribution interfaces.            */
/*                                                                */
/******************************************************************/
struct GlobalData {                             /*                      */
        struct TimerBlock       *pTimers;       /* A(Timer control block). */
        struct NTrec            NT[MAXNODES+1]; /* Node Table.          */
        struct SCB              SCT[MAX_APES];  /* Session Control Table. */
        short                   MyNodeNum;      /* The INCS Node number. */
                                                /*                      */
                                                /* Alarm Collection vars: */
        short                   NeighborNode;   /* INCS conectn to INCS net. */
        unsigned int            SessnTimer;     /* Current APE SetTimer val. */
        unsigned short          CreateDly;      /* Delay following Delete. */
        unsigned short          OpenDly;        /* Delay following Create. */
        unsigned short          Watchdog;       /* Session idle timeout. */
        unsigned short          DefaultTmr;     /* Default session timer. */
        short                   MaxRetries;     /* Max # session rexmts. */
                                                /*                      */
                                                /* Alarm Distribution vars: */
        unsigned char           NamUp;          /* Boolean for alarm distr. */
        unsigned char           MagicUp;        /* Boolean for alarm distr. */
                                                /*                      */
        unsigned char           Msg[256];       /* Used for ErrMsg messages, */
};                                              /*     ... and SQL query. */
extern struct GlobalData *GlobalP;              /* Imported Global Data Ptr. */
#define gP              GlobalP                 /* Shorthand for Global Ptr. */
                                                /******************************/

/******************************************************************/
/*                                                                */
/* Program Data Structures:                                       */
/*                                                                */
/******************************************************************/

/*                                                                */
/* Network Alarm Table Record.                                    */
/*                                                                */
/*    The number of alarm records in the Alarm Table for a particular */
/*    APE's SCB, is determined by the size of the ELM's Alarm Log on the */
/*    APE's node. (This size is conveyed at APE session initialization.) */
/*                                                                */
```

```
/*      The NAT alarm records are copied directly from the ELM alarm tables. */
/*                                                                            */
/*      There is a linked list of alarms for every device which is repre-    */
/*      sented in the NAT. This facilitates alarm distribution.              */
/*                                                                            */
struct NATrec { unsigned char           Sts;            /* Local status of alarm.    */ define         INITIALIZED             0       /*  - Initialized only.      */
define         ACTIVE                  1       /*  - Alarm is active.       */
#define         INACTIVE                2       /*  - Alarm is reset.        */
                                                /*                           */
        unsigned char           AlarmLevel;     /* Level of alarm:           */
                                                /*                           */
#define         MAX_ALARM_VAL           4                   /* max alrm  */
#define         CRI_ALARM       ELM_Critical_Alarm          /* assume 4  */
#define         MAJ_ALARM       ELM_Major_Alarm             /* assume 3  */
#define         MIN_ALARM       ELM_Minor_Alarm             /* assume 2  */
#define         INF_ALARM       ELM_FYI_Alarm               /* assume 1  */
#define         NO_ALARM                0                   /*        0  */
#define         MIN_ALARM_VAL           0                   /* min alrm  */
                                                /*                           */
        unsigned short          Next;           /* Next dev alarm in chain.  */
        unsigned short          Last;           /* Last dev alarm in chain.  */
define         NOLINK                  999     /*   - "null" chain link.    */ struct AtaAlarmEntry    Alarm;          /* Copy of IDNX alarm rec.   */
};

/*                                                                            */
/* Node Table record.                                                         */
/*      This table serves two purposes. It references the APE Session         */
/* Control Block, and it tracks the current status of the nodes in the        */
/* network. Status information is derived generally from messages             */
/* received from the NTA application. When a RESET is received from the       */
/* the current set of nodes defined in the network is read from the           */
/* INCS data base.                                                            */
/*                                                                            */
struct NTrec { unsigned char           ScbIdx;         /* APE SCB index.            */
define         NOSCB                   0xFF    /* default SCT index.        */ unsigned char           Sts;            /* Node status.              */
define         NODE_UP                 1       /*  - Node accessible.       */
#define         NODE_DOWN               2       /*  - Node inaccessible.     */
#define         NODE_DELETED            3       /*  - Node deletd from net.  */
#define         NODE_UNDEFINED          :       /*   Default.                */
```

```
/****************************************************************/
/*                                                              */
/*   Session Control Block (SCB) .... ATA <=> ATAPE.            */
/*                                                              */
/*      This data structure contains all of the variables related to a */
/*          particular APE task.                                */
/*      A fixed number ("MAX_APE") of scb's are created by InitMem() in */
/*          an array called the Session Control Table (SCT).    */
/*          An scb is allocated to an APE session when an IDNX node is */
/*          added to the INCS network.                          */
/*      The SCT index for a given node's scb is determined from the Node */
/*          Table (NT) which is MAX_NODES long, and indexed by IDNX */
/*          node number.                                        */
/*                                                              */
/*      The parameter, MaxAlarmMsgs, indicates the maximum number of alarm */
/*          messages which can be received in one logical window. */
/*          The ATA processes a window of messages, i.e., all of the */
/*          updates for the ELM alarm table, before distributing alarms */
/*          to MAGIC, or to the NAM. This value is derived from the */
/*          parameter AlarmTblLen, which is supplied by the APE at */
/*          session open time.                                  */
/****************************************************************/
struct SCB {                                        /*                                    */
        unsigned char           ScbFlg;             /* SCB resource status flag.*/
#define     AVAILABLE           0x80                /*  - SCB is available.       */
#define     USED                0x10                /*  - SCB in use.             */
#define     TMR_ACTIVE          0x01                /*  - Session tmr is active.*/
                                                    /*                                    */
        unsigned char           Spare;              /*                                    */
        unsigned char           SessnSts;           /* State of APE session.      */
        unsigned char           SessnPendSts;       /* Pending session status.    */
        short                   NodeNum;            /* Node number of APE IDNX. */
        unsigned char           MsgSeqNum;          /* Message sequence number. */
        char                    RetryCnt;           /* Session retry counter.     */
        unsigned int            Timer;              /* TOD of next timeout.       */
        GI_ObjectMsg            *pGiAlarmQueue;     /* LIFO Q of pendng distrib.*/
        struct NamUpdateMsg     *pNamAlarmQueue;    /* LIFO Q of pendng distrib.*/
        struct AtaAlarmMsg      *pRcvAlarmQueue;    /* FIFO Q of rcvd alarm msgs*/
        unsigned char           MaxAlarmMsgs;       /* APE Alarm msg windowsize.*/
        unsigned char           CntAlarmMsgs;       /* # APE alarm msgs rcvd.     */
        short                   NtaMsgType;         /* Trace of NTA msg type.     */
        short                   ApeMsgType;         /* Trace of APE msg type.     */
        short                   AtaMsgType;         /* Trace of ATA msg type.     */
        short                   AlarmTblLen;        /* L(NAT).                    */
        struct NATrec           *pNat;              /* Network Alarm Table ptr. */
};                                                  /*                                    */
                                                    /****************************************/
```

APPENDIX C

Major Data Structures in ATAPE

37 C.F.R. §1.96(a)(2)(ii)

```c
/*******************************************************************/
/*                                                                 */
/* Program Structures and Constants:                               */
/*                                                                 */
/*******************************************************************/

/*                                                                  */
/* Session Control Block (scb) ......... ATAPE <=> ATA protocol.    */
/*                                                                  */
struct SCB {
        unsigned char           SessnSts;       /* State of ATA session.      */
#define         DORMANT_SESSN           1       /* APE created state.         */
#define         OPENING_SESSN           2       /* Open in progress state.    */
#define         IDLING_SESSN            3       /* Active and idling.         */
define         ALARMING_SESSN          4       /* Active and snding alarms.  */ unsigned char           MsgSeqNum;      /* Message sequence number.   */
        short                   NodeNum;        /* Node number of INCS.       */
        struct AtaAlarmMsg     *pAlarmMsg;      /* A(buffrd alarm sent msg).  */
        struct AtaAlarmMsg     *pAlarmQueue;    /* A(queued up alarm msgs).   */
        short                   AtaMsgType;     /* Trace of last ATA msg.     */
        short                   ApeMsgType;     /* Trace of last Ape msg.     */
};

/*                                                                  */
/* ELM Control Block (ecb) .......... ATAPE <=> ELM protocol.       */
/*                                                                  */
struct ECB {
        unsigned char           Sts;            /* State of the protocol.     */
#define         POLLING_SUMMARIES       1       /* Poll alarm summary state.  */
define         READING_ALARMS          2       /* Read alarm table state.    */ int                     TotalAlarmCnt;  /* # Total alarms last poll.  */
        int                     ActiveAlarmCnt; /* # Active alarms last pol.  */
        struct MsgAlarmSummary *pReqSummMsg;    /* A(msg for alarm summ req)  */
        short                   ReqAlarmBlk;    /* Alarm Blk # in last req.   */
#define         NO_REQUEST             -1       /*   - no req outstndng.      */
                                                /*                            */
        struct Tid              ElmTid;         /* Tid of serving ELM.        */
        short                   RetryCnt;       /* Poll retry counter.        */
        short                   ElmMsgType;     /* Trace of last ELM msg.     */
        short                   ApeMsgType;     /* Trace of last APE msg.     */
};

/*                                                                  */
/* Local Alarm Table:                                               */
/*                                                                  */
struct ATRecord { unsigned char           ApeFlg;         /* APE alarm flags:           */
define         CHANGED                 0x80    /*   - alarm rec changed.     */
#define         INACTIVE                0x40    /*   - alarm active|inact.    */
#define         INITIALIZED             0x01    /*   - alarm rec empty.       */
        unsigned char           spare;          /*                            */
        struct AtaAlarmEntry    Alarm;          /* ELM alarm record.          */
};
```

```c
/* Global storage layout:                                                  */
/*                                                                         */
/*      GlobalP is the data pointer registered with the Kernel.            */
/*      gP is defined to be equivalent to GlobalP, as a shorthand reference.*/
/*                                                                         */
/*      The AlarmsPending boolean is a switch between the ATAPE<=>ELM      */
/*      interface and the  ATAPE<=>ATA interface. It is set when new alarms*/
/*      are received from the ELM. It is reset when all outstanding alarms */
/*      sent to the ATA.                                                   */
/*                                                                         */
struct GlobalData {
        struct TimerBlock       *pTimers;       /* A(Timer control block).    */
        struct SCB              scb;            /* ATA session Control Blk.   */
        struct ECB              ecb;            /* ELM Control Block.         */
                                                /*                            */
                                                /* Alarm Table vars:          */
        struct ATRecord         AT[FT_Alarms];  /* Local Alarm Table.         */
        unsigned char           AlarmsPending;  /* Boolean switch for Alarms*/
        unsigned char           ChngdAlarmCnt;  /* # changed alarm records.   */
        unsigned char           ATLocked;       /* Alarm Table semaphore.     */
        unsigned char           CntATblCopies;  /* # copies before match.     */
                                                /*                            */
                                                /* Session variables:         */
        short                   MyNodeNum;      /* This node number.          */
        short                   MyInstance;     /* Instance of this task.     */
        unsigned int            SessnWatchdog;  /* Sessn idle/abort timeout.*/
        unsigned short          SessnIdle;      /* Sessn idle/response tmr.   */
        unsigned short          ElmWatchdog;    /* ELM idle/repeat timeout.   */
        unsigned short          ElmPoll;        /* ELM poll summary timer.    */
};
#if UNITTEST
extern struct GlobalData *GlobalP;              /* Imported Global Data Ptr.*/
#endif
#define gP      ((struct GlobalData *) GlobalP) /* Shorthand for Global Ptr.*/
```

We claim:

1. An apparatus for gathering and displaying information concerning status of a communications network, the network including a plurality of distributed switching nodes and a plurality of links connecting the switching nodes, each of the switching nodes performing tasks including communications functions, maintenance of a node list of alarm conditions for the switching node, and maintenance of a node configuration database identifying a configuration for the switching node; the apparatus comprising:

a monitor node, coupled to a first switching node of the plurality of distributed switching nodes, comprising
an operator input interface,
first means for maintaining topology data indicating the topology of the network and for supporting a first protocol with the first switching node,
second means for maintaining a monitor list of alarm conditions entered in the switching node lists of alarm conditions in the network and for supporting a second protocol through the network with the plurality of distributed switching nodes,
third means for maintaining a monitor database indicating the configuration of the switching nodes as entered in the switching node configuration databases in the network and for supporting a third protocol through the network with the plurality of distributed switching nodes, and
display means, responsive to operator inputs identifying a subject switching node in the network and coupled to the monitor database, the monitor list of alarm conditions and the topology data, for displaying configuration data about the subject switching node, the network topology and the alarm conditions to the operator;

means, on the first switching node, for generating the topology data in response to the communications functions performed on the plurality of switching nodes and for sending, in response to messages according to the first protocol, the topology data to the first means; and means, on each of the plurality of distributed switching nodes in the network, coupled to the switching node list of alarm conditions on the respective switching node, and responsive to messages according to the second protocol, for packaging and sending data indicating alarm conditions to the second means, wherein said data from each of the plurality of distributed switching nodes except the first switching node passes through the network to the first switching node, and through the first switching node to the second means;

means, on each of the plurality of distributed switching nodes in the network, coupled to the switching node configuration database on the respective switching node, and responsive to messages according to the third protocol, for packaging and sending data from the switching node configuration database to the third means, wherein said data from each of the plurality of distributed switching nodes except the first switching node passes through the network to the first switching nodes, and through the first switching node to the third means.

2. The apparatus of claim 1, wherein the display means comprises a display monitor and a graphics processing means for generating a plurality of display windows on the display monitor, and wherein a first window of the plurality of display windows graphically displays the network topology, a second window of the plurality of display windows graphically displays the configuration data about the subject node, and a third window of the plurality of display windows graphically displays the monitor list of alarm conditions.

3. The apparatus of claim 2, wherein the graphics processing means further includes means for highlighting the network topology displayed in the first window in response to at least one alarm condition in the monitor list of alarm conditions maintained by the second means.

4. The apparatus of claim 1, wherein the means, on each of the plurality of distributed switching nodes in the network, for packaging and sending data from the switching node configuration database to the third means includes:
 means for detecting changes to the switching node configuration database; and
 means, responsive to the third protocol, for generating a message including at least a portion of the detected changes.

5. The apparatus of claim 4, wherein the switching node configuration database includes a plurality of blocks of data and a block checksum associated with each block, the means for detecting changes to the switching node configuration database includes:
 means, responsive to the third protocol, for generating a total checksum for all blocks in the switching node configuration database; and
 means for comparing a currently generated total checksum with a previously generated total checksum to detect changes to the database.

6. The apparatus of claim 1, wherein the means, on each of the plurality of distributed switching nodes in the network, for packaging and sending data indicating alarm conditions entered in the switching node list through the network to the second means, includes
 means for detecting alarm conditions entered in the switching node list; and
 means, responsive to the second protocol, for generating a message including at least a portion of the alarm conditions.

7. The apparatus of claim 6, wherein the switching node list includes an alarm table and a numerical indicator associated with the alarm table indicating a number of alarm conditions in the table, and the means for detecting alarm conditions includes
 means for comparing a current numerical indicator with a previous numerical indicator to detect changes to the alarm table.

8. The apparatus of claim 1, wherein each of the plurality of switching nodes maintains a switching node event log listing event records for the switching node and further including:
 fourth means, on the monitor node, for maintaining a list of event records entered in the switching node event logs in the network and for supporting a fourth protocol with the plurality of distributed switching nodes; and
 means, on each of the plurality of distributed switching nodes in the network, coupled to the respective switching node event log on the switching node, and responsive to messages according to the fourth protocol, for packaging and sending data indicating event reports records entered in the switching node event log to the fourth means, wherein said data from each of the plurality of distributed switching nodes except the first switch node passes through the network to the first switching node, and from the first switching node to the fourth means.

9. The apparatus of claim 8, wherein the means, on each of the plurality of distributed switching nodes in the network, for packaging and sending data indicating event records entered in the switching node event log through the network to the fourth means, includes
 means for detecting event records entered in the event log of the switching node; and
 means, responsive to the fourth protocol, for generating a message including at least a portion of the event records.

10. The apparatus of claim 1, wherein at least one node of the plurality of switching nodes comprises a plurality of processing units with tasks performed at the one node being distributed throughout the plurality of processing units, and further wherein the task maintaining the switching node list of alarm conditions and the means, coupled to the switching node list of alarm conditions on the one node, and responsive to the second protocol, for packaging and sending data indicating alarm conditions entered in the switching node list of alarm conditions to the second means through the network, run on one processing unit.

11. The apparatus of claim 10, wherein the communications functions on the one node run on a processing unit other than the one processing unit.

12. The apparatus of claim 1, wherein at least one node of the plurality of switching nodes comprises a plurality of processing units with tasks running at the one node being distributed throughout the plurality of processing units, and further wherein the task maintaining the switching node configuration database and the means, coupled to the switching node configuration database on the one node, and responsive to the third protocol, for packaging and sending data from the switching node configuration database to the third means through the network, run on one processing unit.

13. The apparatus of claim 12, wherein the communications functions on the one node run on a processing unit other than the one processing unit.

14. An apparatus for gathering and displaying information concerning status of a communications network, the network including a plurality of distributed switching nodes and a plurality of links connecting the switching nodes defining a network topology, each of the switching nodes performing communications functions, maintaining an event log including alarm conditions for the switching node, and maintaining a configuration database identifying a configuration for the switching node; the apparatus comprising:
 first monitoring means, coupled to a first switching node of the plurality of distributed switching nodes, for gathering through the first switching node from network nodes and links, and displaying to an operator information concerning the network topology, alarm conditions in the network and configurations for selected nodes in a first subset of the plurality of distributed switching nodes, said first monitoring means including
 an operator input interface,
 first means for maintaining topology data indicating the topology of the network and for supporting a first protocol with the first switching node, second means for maintaining a monitor list of alarm conditions entered in the switching node lists of alarm conditions in the network and for supporting a second protocol through the network with the first subset of the plurality of distributed switching nodes, third means for maintaining a monitor database indicating the configuration of the switching nodes as entered in the switching node configuration databases in the network and for supporting a third protocol through the network with the first subset of the plurality of distributed switching nodes, and display means, responsive to operator inputs identifying a subject switching node in the first subset of the plurality of switching nodes and coupled to the monitor database, the monitor list of alarm conditions and the topology data, for displaying configuration data about the subject switching node, the network topology and the alarm conditions to the operator;

second monitoring means, independent of the first monitoring means and, coupled to a second switching node of the plurality of distributed switching nodes, for gathering through the second switching node from network nodes and links, and displaying to an operator information concerning the network topology, alarm conditions in the network and configurations for selected nodes in a second subset of the plurality of distributed switching nodes, said second monitoring means including an operator input interface, first means for maintaining topology data indicating the topology of the network and for supporting a fourth protocol with the second switching node, second means for maintaining a monitor list of alarm conditions entered in the switching node lists of alarm conditions in the network and for supporting a fifth protocol through the network with the second subset of the plurality of distributed switching nodes, third means for maintaining a monitor database indicating the configuration of the switching nodes as entered in the switching node configuration databases in the network and for supporting a sixth protocol through the network with the second subset of the plurality of distributed switching nodes, and display means, responsive to operator inputs identifying a subject switching node in the network and coupled to the monitor database, the monitor list of alarm conditions and the topology data, for displaying configuration data about the subject switching node, the network topology and the alarm conditions to the operator;

means, on the first switching node, for generating the topology data in response to the communications functions performed on the first subset of the plurality of switching nodes and for sending, in response to messages according to the first protocol, the topology data to the first means on the first monitoring node;

means, on the second switching node, for generating the topology data in response to the communications functions performed on the second subset of the plurality of switching nodes and for sending, in response to messages according to the fourth protocol, the topology data to the first means on the second monitoring node; and means, on each of the plurality of distributed switching nodes in the network, coupled to the switching node list of alarm conditions on the respective switching node, and responsive to messages according to at least one of the second or the fifth protocols, for packaging and sending data indicating alarm conditions to the second means on at least one of the first or second monitoring means, wherein said data from the first and second subsets of the plurality of distributed switching nodes passes through the network to the first switching node or the second switching node, and through the first switching node to the second means on the first monitoring means or through the second switching node to the second means on the second monitoring means; and means, on each of the plurality of distributed switching nodes in the network, coupled to the switching node configuration database on the respective switching node, and responsive to messages according to at least one of the third or sixth protocols, for packaging and sending data from the switching node configuration database to the third means on at least one of the first or second monitoring means, wherein said data from the first and second subsets of the plurality of distributed switching nodes passes through the network to the first switching node or the second switching node, and through the first switching node to the third means on the first monitoring means or through the second switching node to the third means on the second monitoring means.

15. An apparatus for gathering and displaying information concerning status of a communications network, the network including a plurality of distributed switching nodes and a plurality of links connecting the switching nodes, each of the switching nodes performing tasks including communications functions, maintenance of an event log listing event records for the switching node, and maintenance of a configuration database identifying a configuration for the switching node; the apparatus comprising:

a monitor node, coupled to a first switching node of the plurality of distributed switching nodes, comprising an operator input interface, first means for maintaining topology data indicating the topology of the network and for supporting a first protocol with the first switching node, second means for maintaining a monitor list of event records entered in the switching node event logs in the network and for supporting a second protocol through the network with the plurality of distributed switching nodes, third means for maintaining a monitor database indicating the configuration of the switching nodes as entered in the switching node configuration databases in the network and for supporting a third protocol through the network with the plurality of distributed switching nodes, and display means, responsive to operator inputs identifying a subject switching node in the network and coupled to the monitor database, the monitor list of event records and the topology data, for displaying configuration data about the subject switching node, the network topology and the event records to the operator;

means, on the first switching node, for generating the topology data in response to the communications functions performed on the plurality of switching nodes and for sending, in response to messages according to the first protocol, the topology data to the first means; and means, on each of the plurality of distributed switching nodes in the network, coupled to the switching node event log on the respective switching node, and responsive to messages according to the second protocol, for packaging and sending data indicating event records entered in the switching node event log to the second means, wherein said data from each of the plurality of distributed switching nodes except the first switching node passes through the network to the first switching node, and through the first switching node to the second means;

means, on each of the plurality of distributed switching nodes in the network, coupled to the switching node configuration database on the respective switching node, and responsive to messages according to the third protocol, for packaging and sending data from the switching node configuration database to the third means, wherein said data from each of the plurality of distributed switching nodes except the first switching node passes through the network to the first switching node, and through the first switching node to the third means.

16. The apparatus of claim 15, wherein at least one node of the plurality of switching nodes comprises a plurality of processing units with tasks performed at the one node being distributed throughout the plurality of processing units, and further wherein the task maintaining the switching node event log and the means, coupled to the switching node event log on the one node, and responsive to the second protocol, for packaging and sending data indicating event records entered in the switching node event log to the second means through the network, run on one processing unit.

17. The apparatus of claim 16, wherein the communications functions on the one node run on a processing unit other than the one processing unit.

18. The apparatus of claim 15, wherein the switching node event log includes a switching node list of alarm conditions for the switching node, and further including:

fourth means on the monitor node for maintaining a monitor list of alarm conditions entered in the switching node lists of alarm conditions in the network and for supporting a fourth protocol through the network with the plurality of distributed switching nodes;

means, on each of the plurality of distributed switching nodes in the network, coupled to the switching node list of alarm conditions within the event log on the switching node, and responsive to messages according to the fourth protocol, for packaging and sending data indicating alarm conditions entered in the switching node event log to the fourth means, wherein each of the plurality of distributed switching nodes except the first switching node sends said data indicating alarm conditions through the network to the first switching node, and through the first switching node to the fourth means.

19. The apparatus of claim 18, wherein the display means comprises a display monitor and a graphics processing means for generating a plurality of display windows on the display monitor, and wherein a first window of the plurality of display windows graphically displays the network topology, a second window of the plurality of display windows graphically displays the configuration data about the subject node, and a third window of the plurality of display windows graphically displays the monitor list of alarm conditions.

20. The apparatus of claim 19, wherein the graphics processing means further includes means for highlighting the network topology displayed in the first window in response to at least one alarm condition in the monitor list of alarm conditions maintained by the second means.

21. The apparatus of claim 15, wherein the means, on each of the plurality of distributed switching nodes in the network, for packaging and sending data from the switching node configuration database to the third means includes:

means for detecting changes to the switching node configuration database; and means, responsive to the third protocol, for generating a message including at least a portion of the detected changes.

22. The apparatus of claim 21, wherein the switching node configuration database includes a plurality of blocks of data and a block checksum associated with each block, the means for detecting changes to the switching node configuration database includes:

means, responsive to messages according to the third protocol, for generating a total checksum for all blocks in the switching node configuration database; and means for comparing a currently generated total checksum with a previously generated total checksum to detect changes to the database.

23. The apparatus of claim 18, wherein the means, on each of the plurality of distributed switching nodes in the network, for packaging and sending data indicating alarm conditions entered in the switching node list to the fourth means, includes means for detecting alarm conditions entered in the event log of the switching node; and means, responsive to the fourth protocol, for generating a message including at least a portion of the alarm conditions.

24. The apparatus of claim 23, wherein the switching node list includes an alarm table and a numerical indicator associated with the alarm table indicating a number of alarm conditions in the table, and the means for detecting alarm conditions includes means for comparing a current numerical indicator with a previous numerical indicator to detect changes to the alarm table.

25. The apparatus of claim 15, wherein the means, on each of the plurality of distributed switching nodes in the network, for packaging and sending data indicating event records entered in the switching node event log to the second means, includes means for detecting event records entered in the event log of the switching node; and means, responsive to the second protocol, for generating a message including at least a portion of the event records.

26. The apparatus of claim 15, wherein the plurality of switching nodes comprises a plurality of processing units with tasks running at the switching node being distributed throughout the plurality of processing units, and further wherein the task maintaining the switching node configuration database and the means, coupled to the switching node configuration database on the switching node, and responsive to the third protocol, for packaging and sending data from the switching node configuration database to the third means through the network, run on one processing unit.

27. The apparatus of claim 26, wherein the communications functions on the one node run on a processing unit other than the one processing unit.

* * * * *